United States Patent
Miyazaki et al.

(10) Patent No.: US 10,768,193 B2
(45) Date of Patent: Sep. 8, 2020

(54) AUTOMATIC ANALYZER

(71) Applicant: Hitachi High-Technologies Corporation, Tokyo (JP)

(72) Inventors: Masaru Miyazaki, Tokyo (JP); Takamichi Mori, Tokyo (JP); Kouhei Nonaka, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 233 days.

(21) Appl. No.: 15/747,446

(22) PCT Filed: Jul. 13, 2016

(86) PCT No.: PCT/JP2016/070647
§ 371 (c)(1),
(2) Date: Jan. 25, 2018

(87) PCT Pub. No.: WO2017/018214
PCT Pub. Date: Feb. 2, 2017

(65) Prior Publication Data
US 2018/0210003 A1 Jul. 26, 2018

(30) Foreign Application Priority Data
Jul. 29, 2015 (JP) .................. 2015-149166

(51) Int. Cl.
G01N 35/10 (2006.01)
G01N 35/00 (2006.01)
(Continued)

(52) U.S. Cl.
CPC ............ *G01N 35/1079* (2013.01); *B01L 3/52* (2013.01); *G01N 35/00584* (2013.01);
(Continued)

(58) Field of Classification Search
CPC ............ G01N 35/1079; G01N 35/025; G01N 35/00584; G01N 35/1002; G01N 35/02;
(Continued)

(56) References Cited

U.S. PATENT DOCUMENTS 4,974,457 A * 12/1990 Angst ................ G01N 35/1079
73/863.81
5,413,000 A * 5/1995 Stark .................. G01N 35/1079
73/864.23
(Continued)

FOREIGN PATENT DOCUMENTS

JP 56-56800 U 5/1981
JP 06-18531 A 1/1994
(Continued)

OTHER PUBLICATIONS

International Search Report of PCT/JP2016/070647 dated Sep. 20, 2016.

*Primary Examiner* — Benjamin R Whatley
*Assistant Examiner* — Curtis A Thompson
(74) *Attorney, Agent, or Firm* — Mattingly & Malur, PC

(57) ABSTRACT

A needle for forming a cut in a reagent bottle lid is shaped such that an expansion portion which pushes and opens a cut and a piercing portion which forms the cut are integrated with each other. Consequently, only a single operation for moving the needle downwardly will form a cut using the needle and expand the cut using the expansion portion. Further, the smaller diameter of the expansion portion than the diameter of a circumscribed circle of a cross section of the piercing portion but equal to or greater than the diameter of the reagent probe can form cuts uniformly.

9 Claims, 20 Drawing Sheets

ENLARGED VIEW OF PIERCE NEEDLE DISTAL END

(51) Int. Cl.
*G01N 35/02* (2006.01)
*B01L 3/00* (2006.01)
*G01N 35/04* (2006.01)

(52) U.S. Cl.
CPC ........... *G01N 35/02* (2013.01); *G01N 35/025* (2013.01); *G01N 35/1002* (2013.01); *B01L 3/00* (2013.01); *B01L 2200/16* (2013.01); *B01L 2300/044* (2013.01); *G01N 35/1095* (2013.01); *G01N 2035/0097* (2013.01); *G01N 2035/0443* (2013.01)

(58) Field of Classification Search
CPC ... G01N 2035/0443; G01N 2035/0097; G01N 35/1095; B01L 3/52; B01L 3/00; B01L 2200/16; B01L 2300/044
See application file for complete search history.

(56) References Cited

U.S. PATENT DOCUMENTS

| | | | |
|---|---|---|---|
| 5,529,754 A * | 6/1996 | Bonacina | G01B 7/023 324/519 |
| 5,578,272 A | 11/1996 | Koch et al. | |
| 5,935,523 A * | 8/1999 | McCandless | G01N 35/1079 141/330 |
| 2005/0059516 A1* | 3/2005 | Davis | F42B 6/08 473/578 |
| 2006/0199275 A1* | 9/2006 | Togawa | B01L 3/502 436/177 |
| 2008/0265608 A1 | 10/2008 | Neumann et al. | |
| 2009/0056285 A1* | 3/2009 | Kramer | G01N 35/04 53/492 |
| 2010/0126857 A1* | 5/2010 | Polwart | B01L 9/527 204/403.14 |
| 2011/0223061 A1* | 9/2011 | Oonuma | G01N 35/10 422/62 |
| 2014/0194234 A1* | 7/2014 | Miles | F42B 6/08 473/583 |

FOREIGN PATENT DOCUMENTS

| | | |
|---|---|---|
| JP | 06-85295 U | 12/1994 |
| JP | 09-103997 A | 4/1997 |
| WO | 2008/007598 A1 | 1/2008 |

* cited by examiner

FIG. 4
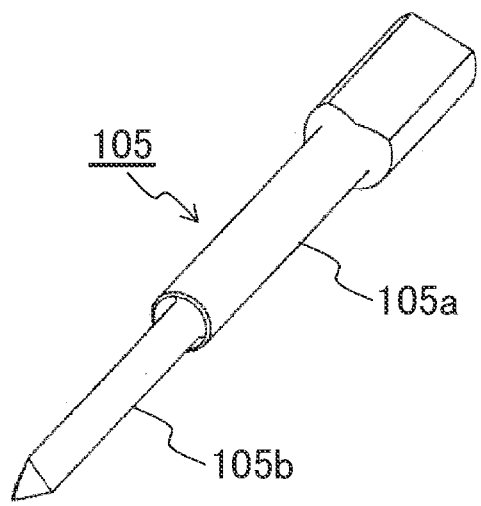
PERSPECTIVE VIEW
FIG. 5
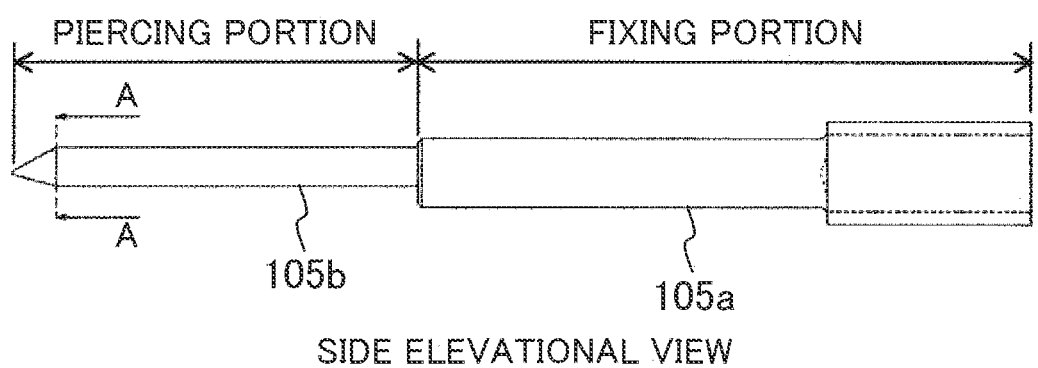
SIDE ELEVATIONAL VIEW
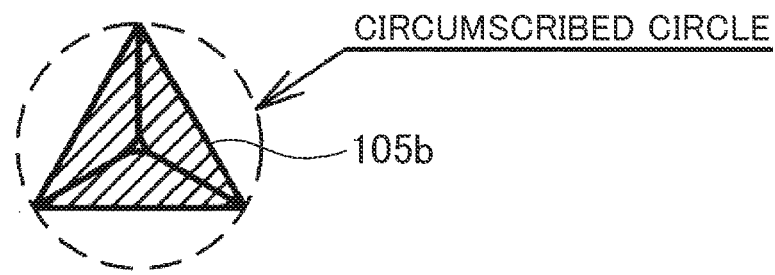
SECTIONAL VIEW (SECTION A-A)

ENLARGED VIEW OF SECTION C-C

ENLARGED VIEW OF SECTION D-D

ENLARGED VIEW OF PIERCE NEEDLE DISTAL END

FIG. 14
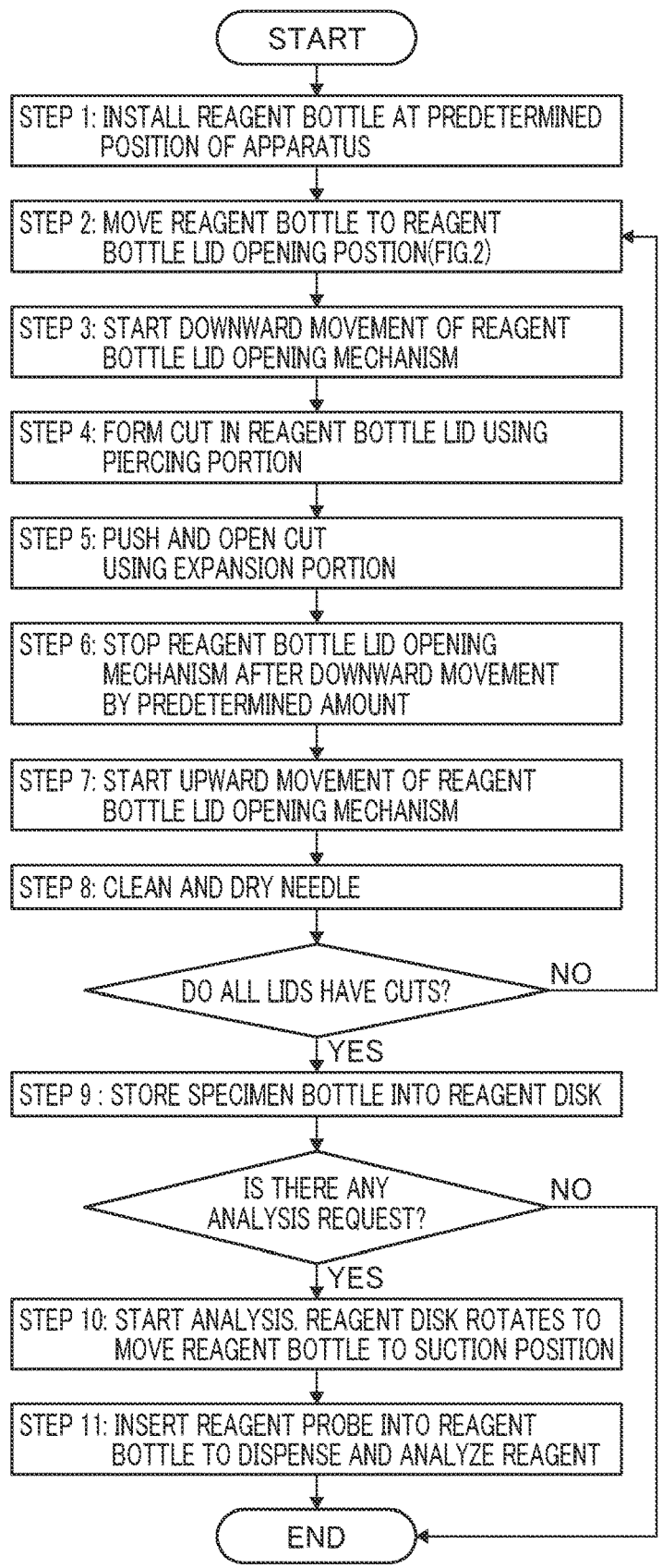
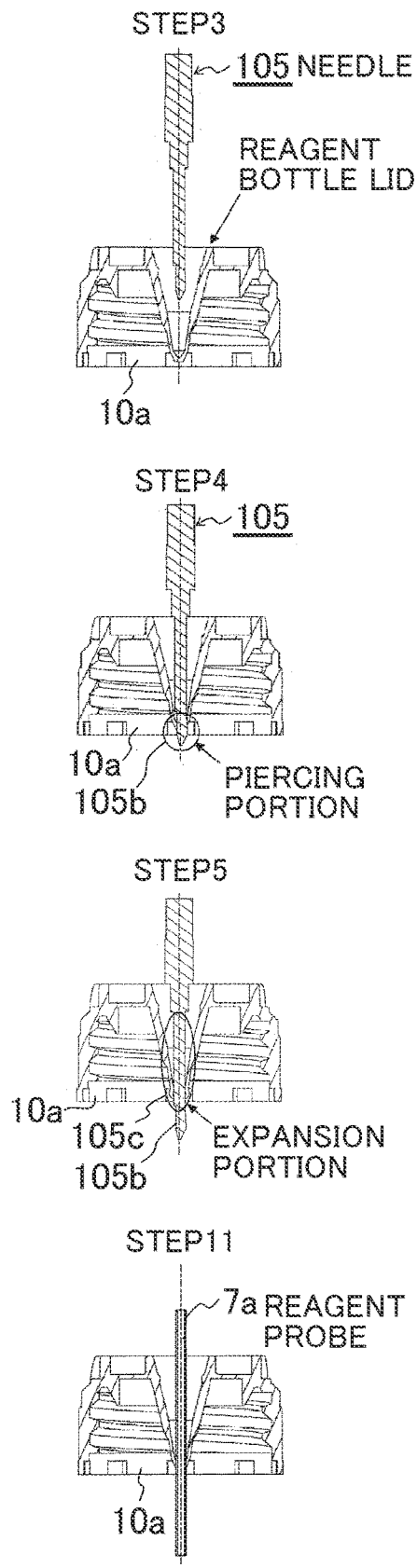

ENLARGED VIEW OF PIERCE NEEDLE DISTAL END

AUTOMATIC ANALYZER

TECHNICAL FIELD

The present invention relates to a dispenser to dispense liquid specimen such as a reagent, blood or urine and an automatic analyzer using the dispenser, and more particularly, to an automatic analyzer having a function of forming a cut in a lid of a reagent bottle.

BACKGROUND ART

For example, to prevent deterioration of a reagent, an automatic analyzer such as a biochemical automatic analyzer or an immune automatic analyzer has a function of forming a small hole in a lid of a reagent bottle using a needle as shown in Patent Literature 1 and dispensing the reagent with a reagent probe from the hole.

When an operator sets one or plural reagent bottles in a reagent mounting mechanism in the device, the device automatically performs, as the hole opening in the lid of the reagent bottle, from formation of a small cut in the lid of the reagent bottle to setting of the reagent bottle on a reagent disk.

CITATION LIST

Patent Literature

Patent Literature 1: Japanese Unexamined Patent Application Publication No. Hei 6-18531

SUMMARY OF THE INVENTION

Technical Problem

In Patent Literature 1, opening of a hole in a lid of a reagent bottle using a spike is disclosed. It is presumed that the distal end of the spike is conically shaped. When the distal end has a conical shape, as the hole has a round shape, the insertion load on the reagent probe is increased. Accordingly, upon actual detection of an obstacle, there is a risk of buckling of the probe due to the load on the probe increased with a spring. When the hole to be opened is enlarged to reduce the insertion load on the reagent probe, there is a possibility of increase of external air inflow, and the problem is that the reagent may be easily deteriorated.

For this reason, to open the lid of the reagent bottle, it is desirable that a cut is formed in the lid with not a spike in a conical shape but a needle having plural blades. However, in Patent Literature 1, the hole opening is focused, but there is no disclosure of forming a cut using plural blades with respect to the center of the lid (formation of a ventilation slot with a blade is disclosed, however, it is not formation of a cut at the center of the lid). Note that the distal end of the cone is not included in the blades. The blade means a member having a sharp distal end to form a linear cut.

Regarding the technique of forming a cut using plural blades, upon insertion of the reagent probe into the cut in the lid of the reagent bottle, load is applied on the reagent probe due to contact between the cut and the reagent probe. Especially upon initial insertion of the reagent probe, the cylindrical reagent probe, expanding the cut, is inserted. The maximum insertion load on the reagent probe upon initial insertion is increased. Further, it is necessary to realize high-speed dispensing operation for improvement of processing performance. It is conceivable that in accordance with increase in operation speed, the load on the reagent probe upon initial insertion is further increased.

The reagent probe is pressed under a spring inside an arm fixing the reagent probe. When the reagent probe is moved downward into contact with an obstacle, it slides and the spring contracts, such that the obstacle is detected with a sensor (collision sensor). In accordance with this detection with the sensor, the downward movement of the reagent probe is stopped. When the load on the reagent probe upon initial insertion is increased, the spring contracts due to the load upon insertion, and erroneous detection as an obstacle may occur.

Further, when the spring constant of the spring to fix the reagent probe is increased to prevent erroneous detection due to the load on the reagent probe upon initial insertion, the load on the reagent probe is increased with the spring upon actual obstacle detection, and there is a risk of buckling of the reagent probe.

Regarding such problem, it is known that the maximum insertion load on the reagent probe is increased only at the initial insertion, but the insertion load is reduced to the half from the second and the subsequent insertion times. Accordingly, addition of a mechanism to expand the cut before insertion of the reagent probe has been studied. With this mechanism, a cut is formed in the lid of the reagent bottle using a needle, then a cylindrical bar (hereinbelow, also referred to as an expansion bar) copied from the shape of the reagent probe is inserted into the cut so as to expand the cut. However, the addition of the mechanism causes problems regarding cost increase and device space saving.

The object of the present invention is to provide an automatic analyzer capable of forming plural cuts with a distal end of a needle and expanding the cut with an expansion bar, by using a part of the needle as the expansion bar (expansion portion), only with downward movement of the needle, without newly adding any mechanism, to solve the above-described various problems.

Solution to Problem

Typical aspects of the present invention will be given below.

The present invention is an automatic analyzer comprising: a sample probe configured to suck a specimen and discharge the specimen into a reaction vessel; a reagent probe configured to suck a reagent and discharge the reagent into the reaction vessel; a photometer configured to analyze a mixture of the specimen and the reagent in the reaction vessel; a reagent disk configured to hold a reagent bottle storing the reagent; a needle configured to form a cut in a lid of the reagent bottle; a lid opening mechanism configured to drive the needle; and a controller configured to control the lid opening mechanism. The above-described needle includes a piercing portion having plural blades to form a cut in the lid of the reagent bottle, and a cylindrical expansion portion to push and open the cut. The plural blades are provided at vertices of a regular polygon seen from the distal end side of the piercing portion. The diameter of the above-described cylindrical expansion portion is smaller than the maximum diameter of the circumscribed circle of the plural blades of the piercing portion, and is equal to or larger than the maximum diameter of the reagent probe within a range of insertion into the reagent bottle to a position at which the reagent probe sucks the reagent. The controller controls the lid opening mechanism so that the needle is inserted to the expansion portion after a cut is formed in the lid of the bottle by the piercing portion.

Further, another aspect of the present invention is an automatic analyzer including: a sample probe configured to suck a specimen and discharge the specimen into a reaction vessel; a reagent probe configured to suck a reagent and discharge the reagent into the reaction vessel; a photometer configured to analyze a mixture of the specimen and the reagent in the reaction vessel; a reagent disk configured to hold a reagent bottle storing the reagent; a needle configured to form a cut in a lid of the reagent bottle; a lid opening mechanism configured to drive the needle; and a controller configured to control the lid opening mechanism. The needle includes a piercing portion including plural blades for forming a cut in the lid of the bottle, and a cylindrical or polygonal expansion portion configured to push and open the cut. The cylindrical expansion portion or a circumscribed circle of the polygon has a diameter which is smaller than a maximum diameter of a circumscribed circle of the plurality of blades of the piercing portion but is equal to or larger than a maximum diameter within a range within which the reagent probe is inserted into the reagent bottle to a position at which the reagent probe sucks the reagent. The controller controls the lid opening mechanism so that the needle is inserted to the expansion portion after the cut is formed in the lid of the bottle with the piercing portion.

Further, another aspect of the present invention is an automatic analyzer including: a sample probe configured to suck a specimen and discharge the specimen into a reaction vessel; a reagent probe configured to suck a reagent and discharge the reagent into the reaction vessel; a photometer configured to analyze a mixture of the specimen and the reagent in the reaction vessel; a reagent disk configured to hold a reagent bottle storing the reagent; a needle configured to form a cut in a lid of the reagent bottle; a lid opening mechanism configured to drive the needle; and a controller configured to control the lid opening mechanism. The needle has a piercing portion including plural blades to form a cut in the lid of the bottle. The piercing portion has a structure as a combination of the plural blades and a cone. In the piercing portion, viewed from the distal end, the plural blades extended outward from the center are provided on a side surface of the cone. The controller carries out control for inserting the piercing portion through the lid of the reagent bottle so that the needle forms a cut in the lid of the bottle by the plural blades and pushes and opens the formed cut by the cone.

Advantageous Effects of Invention

According to the present invention, it is possible to realize an operation to form a cut in the lid of the reagent bottle with the piercing portion and push and open the cut with the expansion portion, only with downward movement of the needle. Therefore addition of a mechanism to push and open the cut is unnecessary.

With this configuration, it is possible to reduce the maximum insertion load on the reagent probe upon initial insertion without addition of any new mechanism. Further, as a new mechanism is not added, it is possible to prevent cost increase and attain space saving in the device.

Further, as the piercing portion has a structure as a combination of the plural blades and a cone, it is possible to form a cut in the lid of the reagent bottle with the plural blades and to push and open the opened cut with the cone. With this configuration, it is possible to attain a similar advantage to that attained in the previously-described aspect.

BRIEF DESCRIPTION OF DRAWINGS

FIG. 4 is a perspective view of a pierce needle as a study target.

FIG. 5 illustrates a side elevational view and a view of section A-A of the pierce needle as a study target.

FIG. 14 is a flowchart showing formation of a cut in the lid of the reagent bottle using the pierce needle shown in FIG. 11.

DESCRIPTION OF EMBODIMENTS

Figure 1:
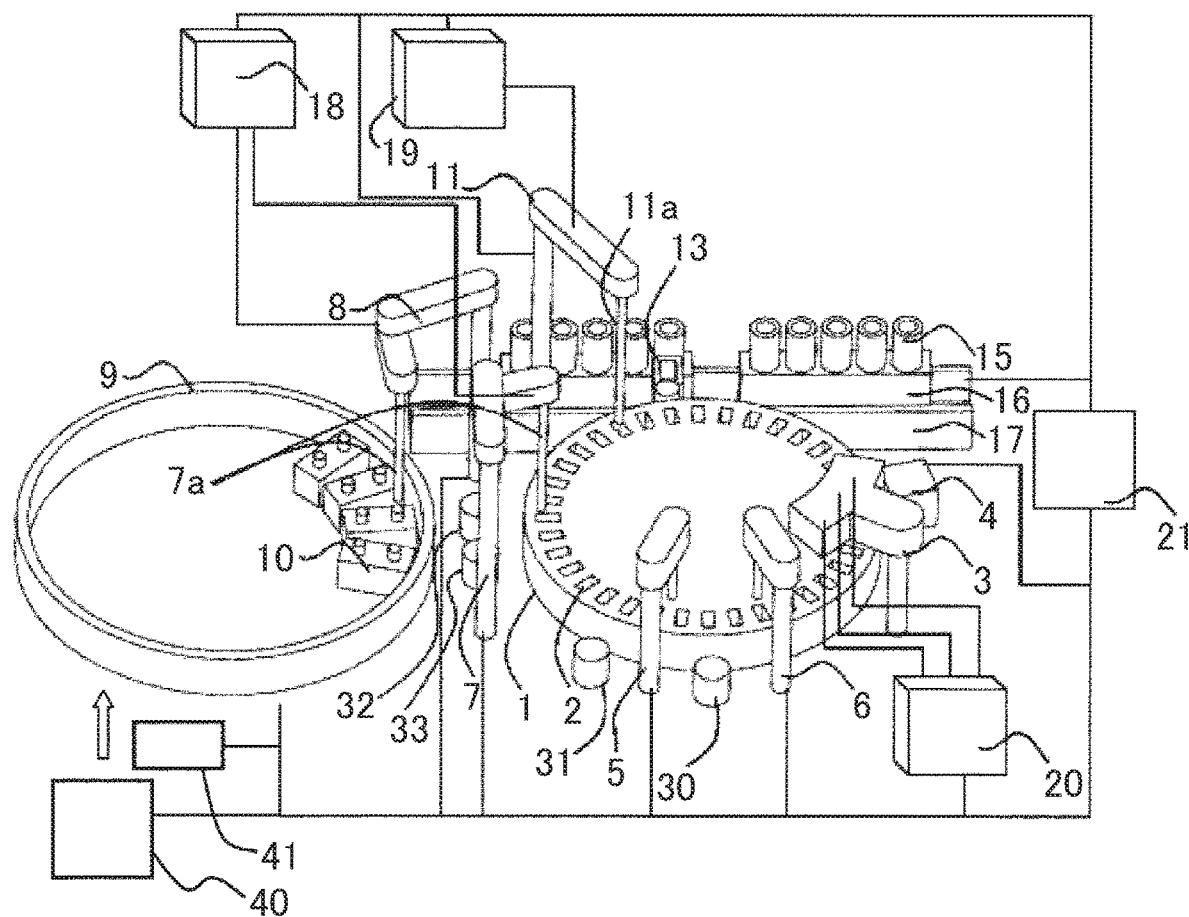
FIG. 1 illustrates the entire configuration of an automatic analyzer according to an embodiment of the present invention.

FIG. 1 illustrates the entire configuration of an automatic analyzer according to an embodiment of the present invention. Since the functions of the respective parts are known, detailed description of these functions will be omitted.

In a reaction disk 1, reaction vessels 2 are arrayed on a circumference. In a reagent disk 9, plural reagent bottles 10 are held on a circumference. In the vicinity of the reaction disk 1, a specimen transport mechanism 17 to move a rack 16 carrying a specimen vessel 15 is installed. Note that the reagent bottle 10 contains a reagent, and the specimen vessel 15 contains a specimen.

Rotatable and vertically-movable reagent dispensing mechanisms 7 and 8 are installed between the reaction disk 1 and the reagent disk 9, and they are provided with a reagent probe 7a. A reagent syringe 18 is connected to the reagent probe 7a.

A rotatable and vertically-movable sample dispensing mechanism 11 is installed between the reaction disk 1 and the specimen transport mechanism 17. The sample dispensing mechanism is provided with a sample probe 11a. A specimen syringe 19 is connected to the sample probe 11a.

The sample probe 11a moves while drawing a circle about a rotation shaft, to perform specimen dispensing from the specimen vessel 15 to the reaction vessel 2.

A cleaning mechanism 3, a spectrophotometer 4, agitation mechanisms 5 and 6, the reagent disk 9, and the specimen transport mechanism 17 are provided around the reaction disk 1. A cleaning pump 20 is connected to the cleaning mechanism 3. Cleaning tanks 13, 30, 31, 32, and 33 are respectively installed in operation ranges of the reagent dispensing mechanisms 7 and 8, the sample dispensing mechanism 11, and the agitation mechanisms 5 and 6. The specimen vessel 15 contains a biological specimen such as blood or urine. The specimen vessel is placed on a rack 16, and carried with the specimen transport mechanism 17.

Further, a lid opening mechanism 40 for the reagent bottle 10 is provided around the reagent disk 9. The lid of the reagent bottle 10 is opened with the lid opening mechanism 40 before the reagent bottle is placed on the reagent disk 9. The opened reagent bottle 10 is transferred with the reagent bottle transport mechanism 41 from the lid opening mechanism 40 to the reagent disk 9.

Further, the respective mechanisms are connected to a controller 21. The respective mechanisms are controlled with the controller 21.

In the reagent bottle 10, a lid is attached to the position of a reagent probe suction port to tightly close the inside. Generally the lid is removed upon setting of the reagent probe in the device, and the reagent probe is installed in the device. In recent years, a method of forming a cut-shaped hole in the lid, and inserting the reagent probe 7a into the cut for sucking the reagent is known. Since the opening in the lid is made with a small cut, the contact between the reagent and the air is suppressed to a minimum amount. In comparison with the conventional art, the deterioration of the reagent is improved. The automatic analyzer according to the present embodiment is also provided with the lid opening mechanism 40 to open this cut-shaped hole.

Note that a replenishing reagent bottle storage may be provided (not shown) to store the reagent bottle 10 before/after lid opening of the reagent bottle 10 before it is transferred to the reagent disk 9. Further, in the above example, the lid opening mechanism 40 is provided outside the reagent disk 9. However, it may be configured such that the lid opening mechanism is provided inside the reagent disk 9, and with respect to the reagent bottle 10 placed on the reagent disk 9, a cut is directly opened in the lid.

Next, an analysis operation will be described. The sample probe 11a sucks a specimen from the specimen vessel 15 and discharges the specimen into the reaction vessel 2. Further, the reagent probe 7a sucks a reagent from the reagent bottle 10 and discharges the reagent into the reaction vessel 2. The mixture of the specimen and the reagent in the reaction vessel 2 is agitated with the agitation mechanisms 5 and 6. The agitated mixture is irradiated with light emitted from a light source. The irradiated light is periodically received with the spectrophotometer 4. The controller 21 calculates the concentration of an inspection item corresponding to the reagent contained in the specimen and the like, from the amount of the periodically received light. The spectrophotometer 4 is e.g. a light-absorption photometer or a light-scattering photometer.

Figure 2:
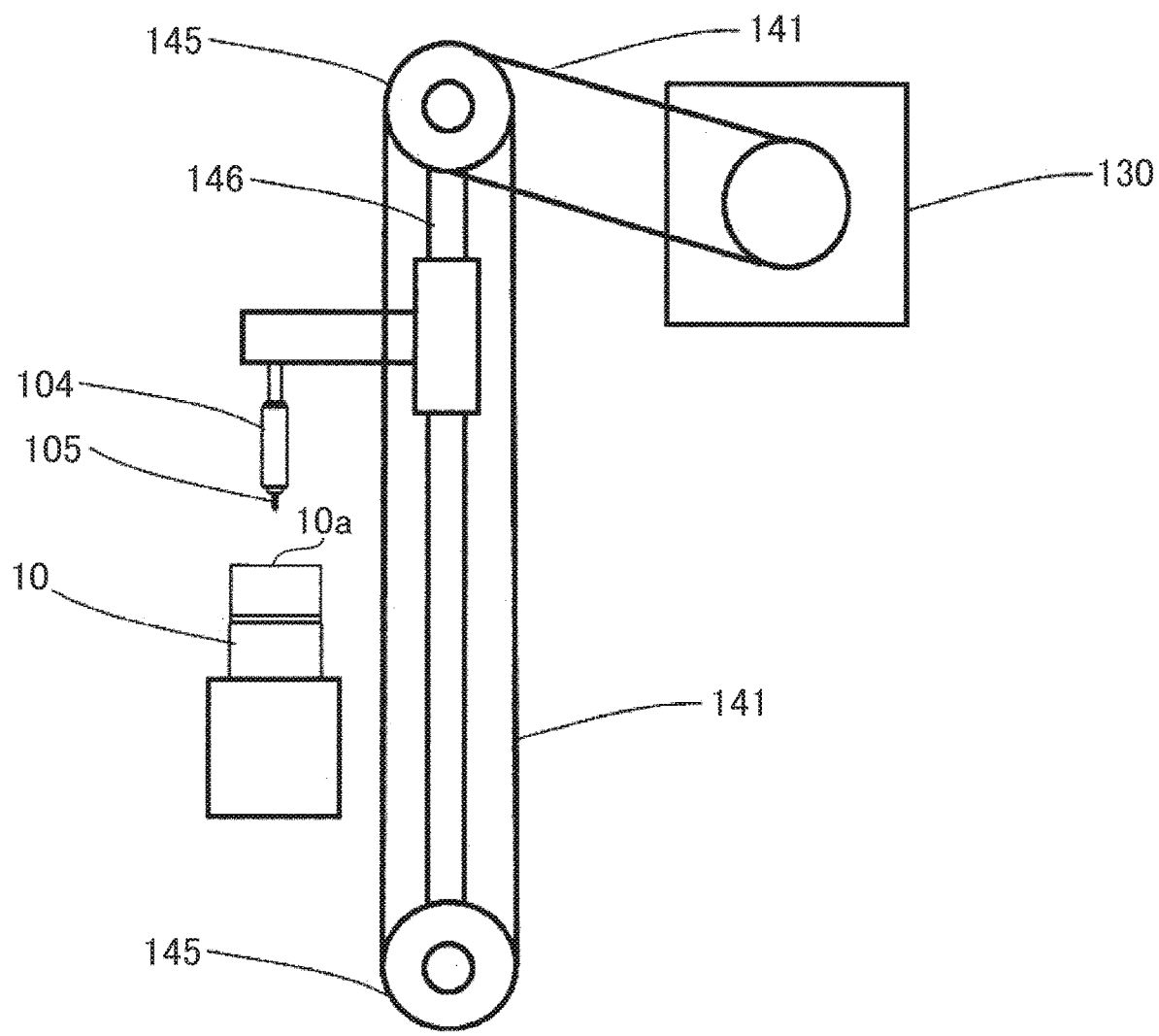
FIG. 2 illustrates a pierce needle before a downward movement.
Figure 3:
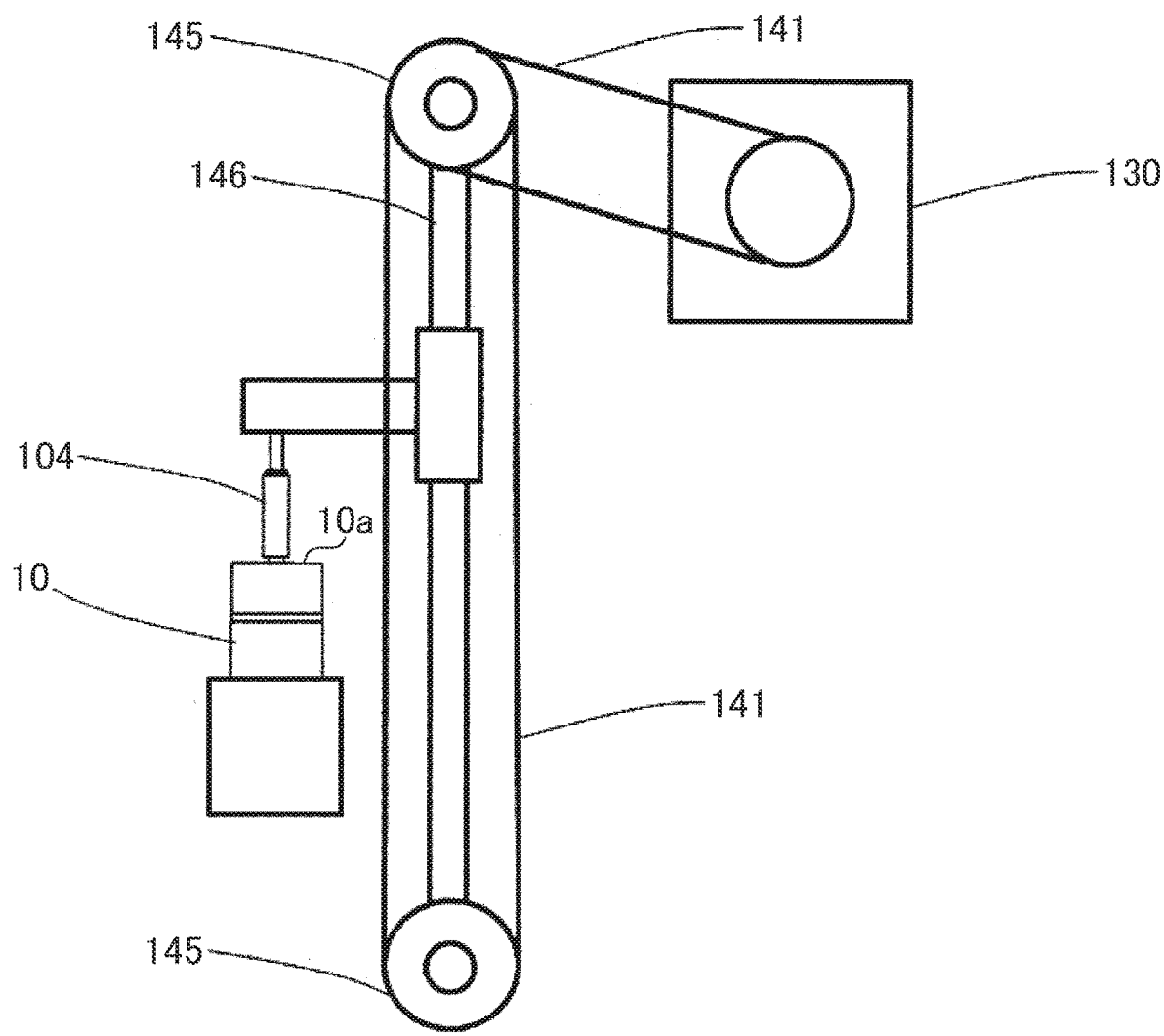
FIG. 3 illustrates the pierce needle after a downward movement.

The lid opening mechanism 40 will be described with reference to FIG. 2 and FIG. 3. FIG. 2 illustrates a pierce needle before a downward movement. FIG. 3 illustrates the pierce needle after the downward movement. The lid opening mechanism 40 includes, as primary members, a reagent bottle lid opening mechanism 104 and a pierce needle 105. The lid opening mechanism 40 drives the pierce needle 105 to move downward and upward. The pierce needle 105 to form a cut in a lid 10a of the reagent bottle is attached to the reagent bottle lid opening mechanism 104. When a cut is formed in the lid 10a of the reagent bottle, a vertically driving motor 130 moves the reagent bottle lid opening mechanism 104 downward with a belt 141 and a pulley 145 along a slider 146 toward the reagent bottle 10 installed below the reagent bottle lid opening mechanism 104, as shown in FIG. 3. When a cut is formed in the lid 10a of the reagent bottle, the vertically driving motor moves the reagent bottle lid opening mechanism upward.

FIG. 4 illustrates a perspective view of the pierce needle as a study target. FIG. 5 illustrates a side elevational view and a view of section A-A of the pierce needle as a study target. As shown in FIG. 4 and FIG. 5, the pierce needle 105 has a fixing portion 105a fixed to the reagent bottle lid opening mechanism 104, and a piercing portion 105b to form a cut by being pierced into the reagent bottle 10. The piercing portion 105b has a triangular prism shape with a triangular pyramid attached to its distal end. It has a structure to form a three-sided cut along the distal end triangular pyramid in the cap by piercing the piercing portion 105b. In A-A section in FIG. 5, a hatched portion indicates a cross section of the piercing portion 105b. The hatched portion has the same shape as that of the portion of the reagent bottle passed through the lid 10a.

Figure 6:
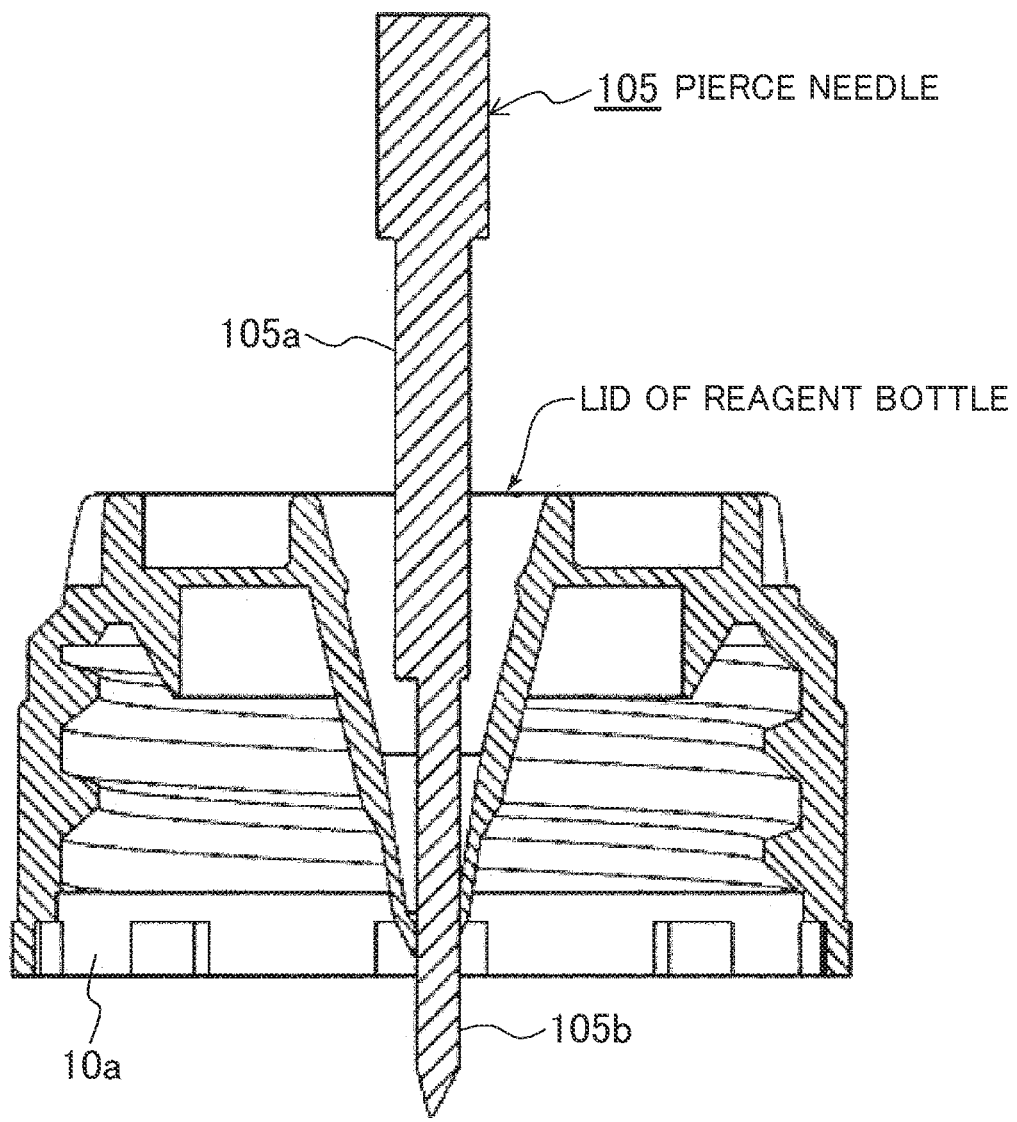
FIG. 6 is a cross-sectional view showing insertion of the pierce needle as a study target in a lid of a reagent bottle.

FIG. 6 is a cross-sectional view showing insertion of the pierce needle as a study target into the reagent bottle lid. In FIG. 6, a cut is formed in the lid 10a of the reagent bottle by insertion of the piercing portion 105b into the lid 10a of the reagent bottle. The insertion into the reagent bottle 10 is made to the triangular prism portion of the piercing portion 105b. After the insertion in this manner, the pierce needle 105 is moved upward, and a cut is formed in the lid 10a of the reagent bottle.

Figure 7:
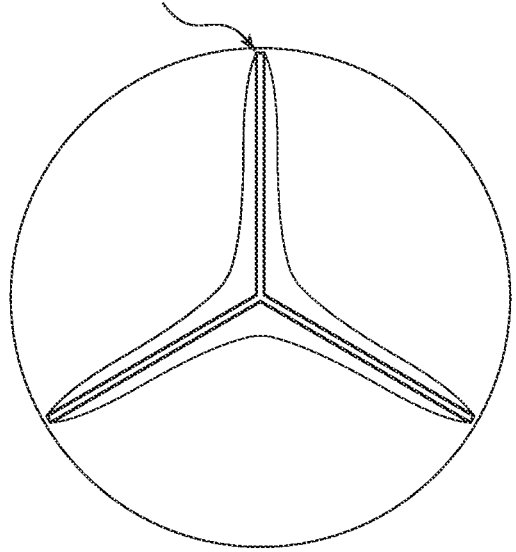
FIG. 7 is a view of the lid of the reagent bottle as seen from the bottom face side.

FIG. 7 illustrates a view of the cut-formed lid 10a of the reagent bottle seen from the bottom face side. As shown in FIG. 7, the pierce needle 105 forms a three-sided cut in the lid 10a of the reagent bottle with the triangular-pyramid shape at its distal end. It shows that a triangular hole is opened around the center by forming a cut. In the example shown in FIG. 4 and FIG. 5, the triangular pyramid is attached to the distal end of the triangular prism. Further, a cut is formed by a similar principle with another polygonal shape such as a quadratic prism with a quadrangular pyramid attached to its distal end.

Figure 8:
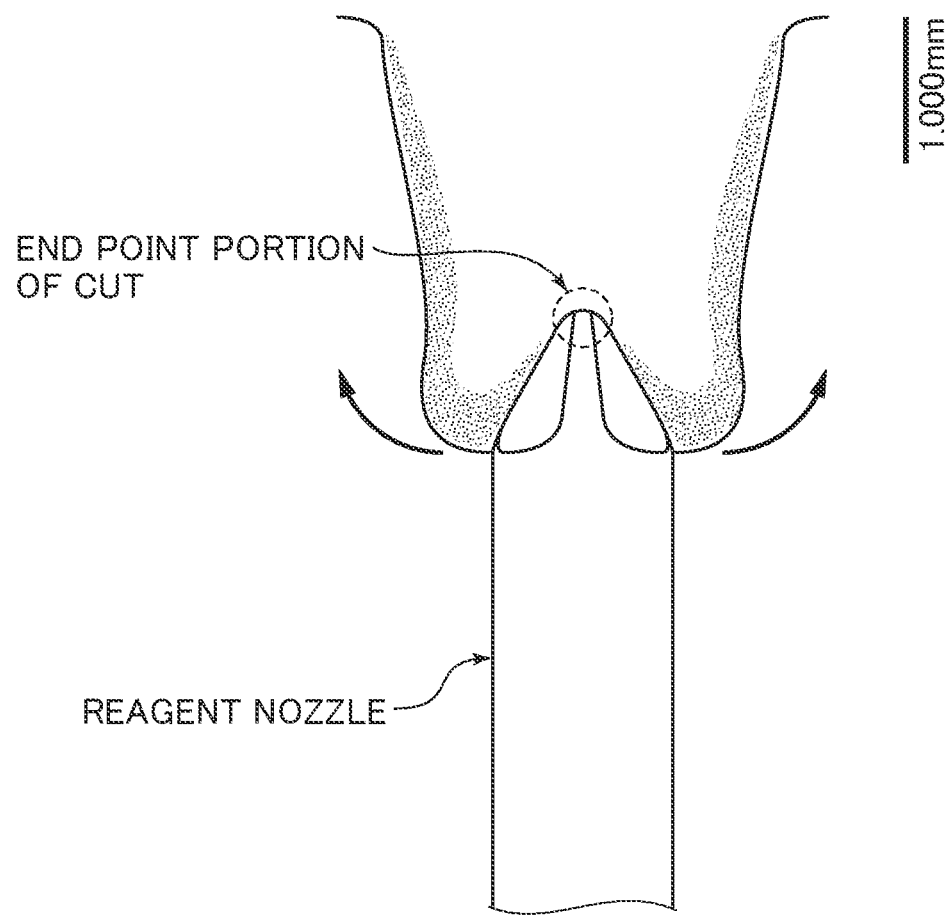
FIG. 8 is a photograph upon insertion of a reagent probe.

FIG. 8 shows a photograph upon insertion of the reagent probe. The photograph is taken from a side surface direction of the reagent probe 7a inside the reagent bottle 10. It shows the reagent probe (reagent nozzle) 7a, pushing and opening the cut in the lid 10a of the reagent bottle, is inserted. Note that an opening of the reagent probe (reagent nozzle) 7a exists on the lower side of the photograph. As shown in the photograph of FIG. 8, it is understood that the reagent probe 7a is inserted by pushing and opening one side of the cut in the lid 10a of the reagent bottle. Other unshown two sides are similarly pushed and opened. When the reagent probe 7a is pulled out, then the pushed-and-opened cut returns to the initial state (see FIG. 7) by the elasticity of the lid 10a of the reagent bottle. In this manner, in the opening of the lid 10a of the reagent bottle using the pierce needle 105, it is possible to prevent deterioration of the reagent by reducing the area of the opening in the lid 10a of the reagent bottle to suppress air inflow or the like. However, to dispense the reagent, as the reagent probe 7a, pushing and opening the cut in the lid 10a of the reagent bottle, is inserted, load due to friction between the reagent probe and the lid 10a of the reagent bottle is applied on the reagent probe 7a.

In some cases, immediately after the cut formation with the pierce needle 105 in the lid 10a of the reagent bottle, the endpoints of the cut in FIG. 8 are not completely separated but slightly connected. Upon initial insertion of the reagent probe 7a, as the reagent probe 7a, pushing and opening the cut in the lid 10a of the reagent bottle, is passed through, the slightly-connected portions are further opened. This increases the maximum load upon insertion. By opening the slightly-connected portions of the cut endpoints to expand the cut, upon second and subsequent insertion of the reagent probe 7a, as the slightly-connected portions are already opened, the maximum load upon insertion is reduced.

The reagent probe 7a is provided with a collision sensor (not shown), to detect contact with an obstacle to stop downward movement of the reagent probe 7a. Further, the reagent probe 7a is pressed under a spring (not shown) inside an arm fixing the reagent probe 7a, and it is slidable upward and downward. The spring pressing the reagent probe 7a has a spring constant not contract upon application of load in insertion into the reagent bottle 10. This setting is made so as to prevent stoppage of the reagent probe 7a by detection of slide of the reagent probe 7a with the sensor upon downward movement of the reagent probe 7a to contact between the reagent probe and an obstacle. When the load on the reagent probe 7a upon initial insertion is increased, there is a risk of erroneous detection as an obstacle due to contract of the spring by the load in the insertion. Further, to prevent erroneous detection due to the load on the reagent probe 7a upon initial insertion, when the spring constant of the spring fixing the reagent probe 7a is increased, the sensitivity to actually detect an obstacle is lowered. When the reagent probe 7a becomes into contact with an obstacle, it may damage the obstacle. Otherwise, when the load on the reagent probe 7a is increased with the spring, there is a risk of buckling of the reagent probe 7a.

Further, as shown in FIG. 7, the cut has three sides, and the cut shown in FIG. 8 has three endpoints. However, in some cases, only one or two of the three endpoints or slightly-connected portion(s) is opened upon initial insertion of the reagent probe 7a. This may occur when a shift occurs between the pierce needle 105 and the central axis of the lid 10a of the reagent bottle upon cut formation, when the diameter of a circumscribed circle of a triangle in a horizontal cross section of the pierce needle 105 (the size of the cut) is larger than the diameter of the reagent probe 7a inserted into the cut, or when a shift occurs between the central axis of the reagent probe 7a and the center of the cut upon insertion of the reagent probe. When only one or two endpoints of the cut are opened, the force to close the cut by elasticity of the lid 10a of the reagent bottle is stronger than that in a case where all the three points of the cut are opened, and the frictional resistance upon insertion of the reagent probe 7a is increased. When the reagent probe 7a repeatedly slides with high frictional resistance, a burr may occur in an unopened portion of the cut. It is considered that when the center of the cut is shifted, and at each time of repeated sliding, as the insertion is not made in the same position, the burr occurs due to application of a force to open the cut from various directions to the unopened portion of the cut. When the burr falls off in the reagent bottle 10, it is sucked into the reagent probe 7a, and the reagent probe 7a is clogged. Otherwise, when the burr is discharged in the reaction vessel 2, where is a risk of influence on the analysis result.

As a method for reducing the maximum load on the reagent probe 7a upon initial insertion, the pierce needle 105 may be enlarged. However, when the pierce needle 105 is enlarged, the area of the opening in the lid 10a of the reagent bottle is increased. In addition to the increase of the air inflow to cause deterioration of the reagent, the following problems may occur.

Figure 9:
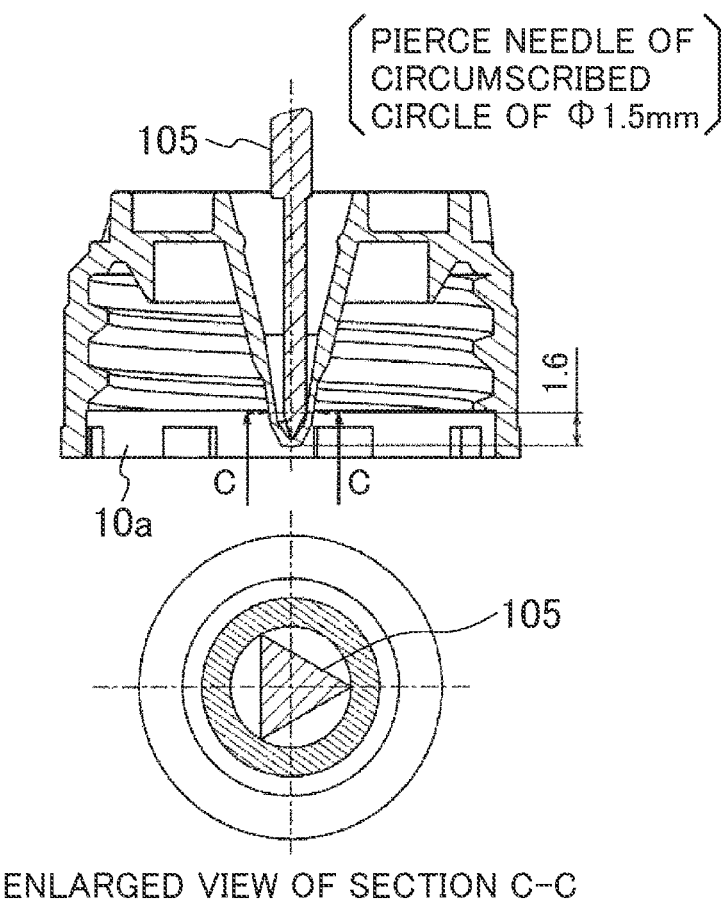
FIG. 9 illustrates a longitudinal sectional view and its enlarged view of section C-C upon insertion of the pierce needle having a diameter of circumscribed circle of φ1.5 mm in the lid of the reagent bottle.
Figure 10:
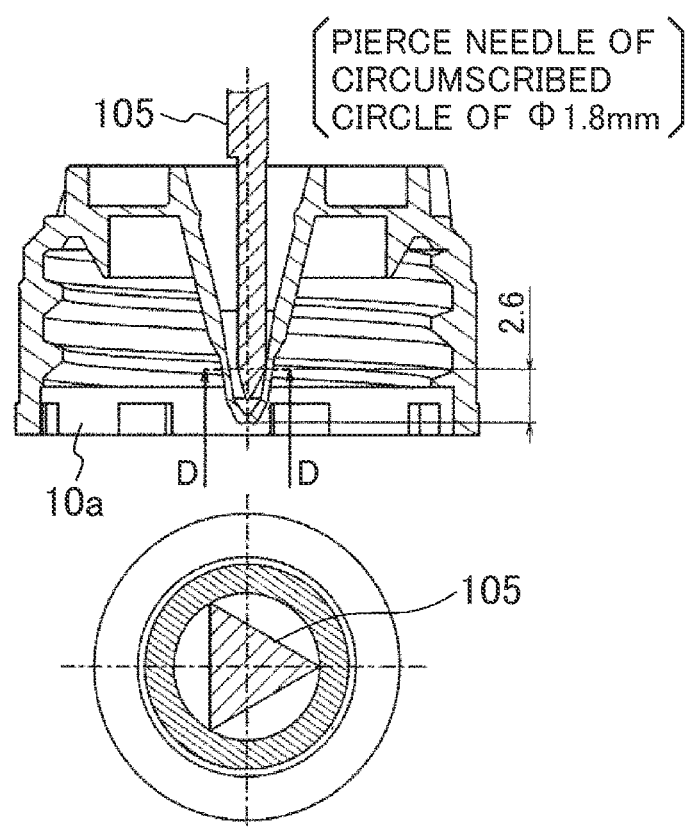
FIG. 10 illustrates a longitudinal sectional view and its enlarged view of section D-D upon insertion of the pierce needle having a diameter of circumscribed circle of φ1.8 mm in the lid of the reagent bottle.

As shown in FIG. 5, in the pierce needle 105, the piercing portion 105b has a triangular cross section. The triangular shape has a size such that the diameter of the circumscribed circle is about ϕ1.5 mm. When a cut is formed with the pierce needle 105 in the lid 10a of the reagent bottle as shown in FIG. 6, the area of the cut expanded along the triangular horizontal cross-sectional shape of the pierce needle 105 is about 0.73 mm². On the other hand, when the cut is widened in a circle shape along the outer shape of the reagent probe 7a upon insertion of the reagent probe 7a into the cut in the lid 10a of the reagent bottle, the area is 1.04 mm². Assuming that the area expanded along the triangular horizontal cross-sectional shape of the pierce needle 105 upon formation of the cut with the pierce needle 105 is about the same as that upon insertion of the reagent probe, it is necessary that the diameter of the circumscribed circle of the pierce needle 105 is about ϕ1.8 mm. FIG. 9 illustrates a longitudinal sectional view and its enlarged view of section C-C when the pierce needle 105 comes into contact with the lid 10a of the reagent bottle upon insertion of the pierce needle 105 having a diameter of circumscribed circle of ϕ1.5 mm in the lid 10a of the reagent bottle. FIG. 10 illustrates a longitudinal sectional view and its enlarged view of section D-D when the pierce needle 105 comes into contact with the lid 10a of the reagent bottle upon insertion of the pierce needle 105 having a diameter of circumscribed circle increased to ϕ1.8 mm in the lid 10a of the reagent bottle. In a comparison between FIG. 9 and FIG. 10, when the diameter of the circumscribed circle is increased to ϕ1.8 mm, contact is made at a height from the bottom of the cone shape of the lid 10a of the reagent bottle in a higher position than in the case where the diameter is ϕ1.5 mm. When a cut is formed with the pierce needle 105 from this position, the cut formed inside the cone shaped lid 10a of the reagent bottle is increased. There is a high possibility that the opening of the cut may be non-uniform or the cut may not be completely opened. Upon insertion of the reagent probe 7a, due to the contact between the reagent probe 7a and the cut and repeated sliding, there is a possibility that the inner part is shaved or a burr occurs and falls off. When such foreign particle drops in the reagent bottle 10, it causes clogging in the reagent probe 7a. When the circumscribed circle of the pierce needle 105 is increased, since the risk of clogging or the like is higher due to the above-described inconveniences, it is necessary to change the shape of the lid 10a of the reagent bottle. When the shape of the lid 10a of the reagent bottle is not changed, to prevent the high risk, it is necessary that the diameter of the circumscribed circle of the pierce needle 105 is ϕ1.5 mm.

To address such problems, the present inventors studied addition of a mechanism to push and open the cut in the lid 10a of the reagent bottle before insertion of the reagent probe (reagent nozzle) 7a. The mechanism inserts an expansion bar in a cylindrical shape copied from the reagent probe 7a into the cut in the lid 10a of the reagent bottle to expand the cut. However, it is necessary to add an expansion bar vertically-moving mechanism, operation time for cleaning and drying tanks for the expansion bar, and installation place of the mechanism. The addition of the mechanism increases the cost, and disturbs space saving. Further, although the cut is made uniformly in the three sides in FIG. 7, generally, the cut is larger than the diameter of the reagent probe 7a. Accordingly the central axis upon insertion of the expansion bar may be shifted. There still remains a possibility that only one or two of the three sides of the cut are opened.

Hereinbelow, embodiments of the present invention, with the pierce needle 105 as a main element capable of solving the above-described problems, will be described using the drawings.

First Embodiment

Figure 11:
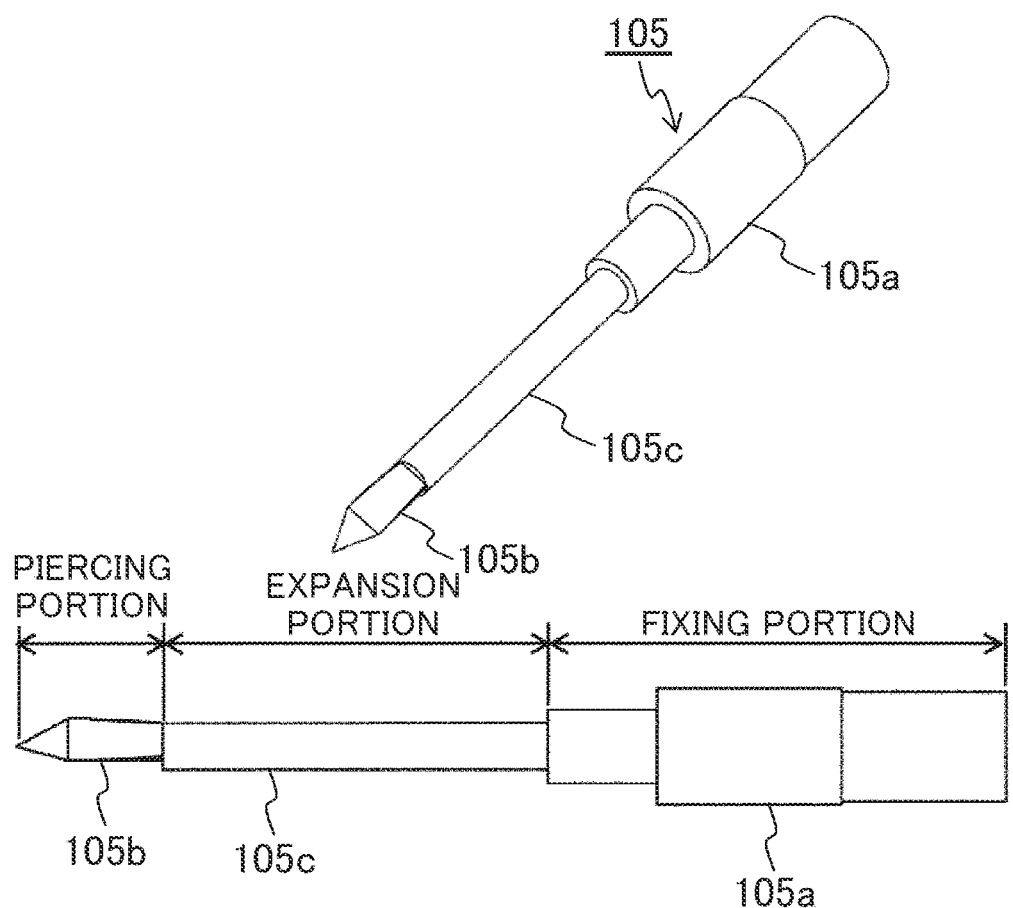
FIG. 11 illustrates a perspective view and a side elevational view of a pierce needle according to the embodiment of the present invention.
Figure 12:
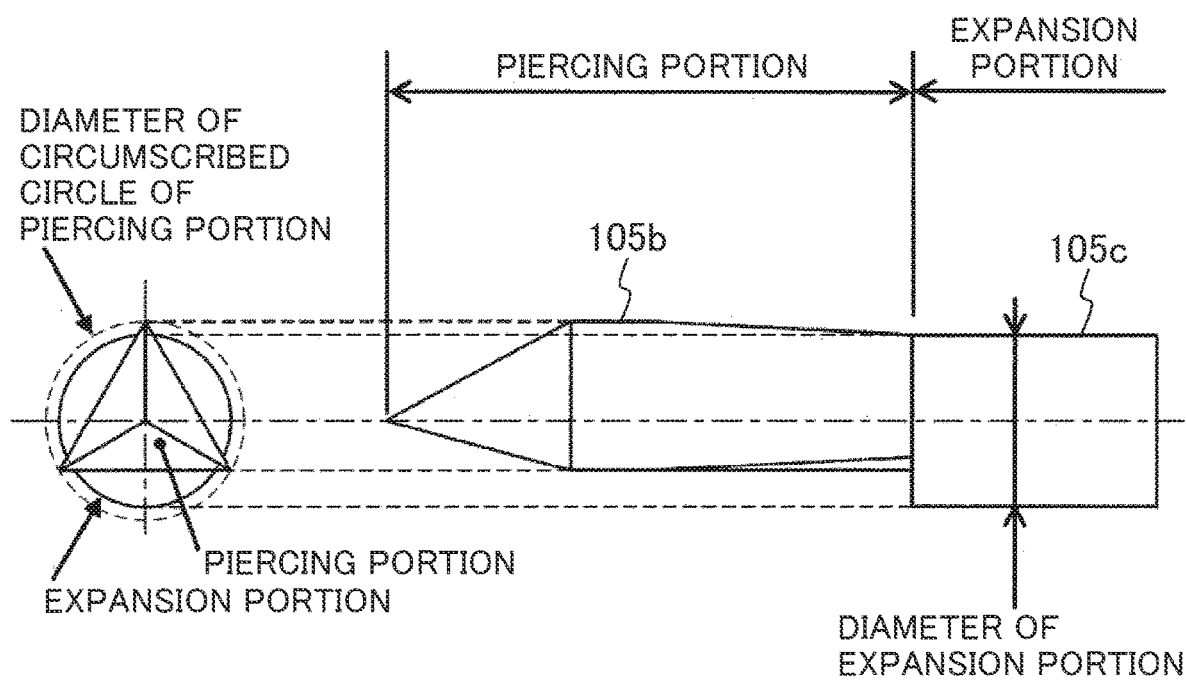
FIG. 12 illustrates a push and opened view of a distal end of the pierce needle shown in FIG. 11.

FIG. 11 illustrates a perspective view and a side elevational view of the pierce needle according to a first embodiment of the present invention. FIG. 12 illustrates an enlarged view of the distal end of the pierce needle shown in FIG. 11. As shown in FIG. 11, the pierce needle 105 has a shape formed by integrating the piercing portion 105b to form a cut and the expansion portion 105c to push and open the cut. The piercing portion 105b at the distal end has a triangular pyramid shape as in the case of FIG. 4 and FIG. 5. The integrated expansion portion 105c has a cylindrical shape copied from the reagent probe 7a. As the piercing portion 105b to form a cut and the expansion portion 105c to push and open the cut are integrated with each other, the central axis of the piercing portion 105b and the central axis of the expansion portion 105c are aligned. As shown in FIG. 12, the diameter of the expansion portion 105c is smaller than the diameter of the circumscribed circle of the piercing portion 105b. To reduce the insertion load on the reagent probe 7a, the diameter of the expansion portion 105c may be the same as the diameter of the reagent probe 7a, and further, it is desirable that the diameter of the expansion portion 105 is larger than the diameter of the reagent probe.

FIG. 12 is an example where the distal end of the piercing portion 10b is shaped in an equilateral triangular pyramid and shows three blades. The respective blades are formed from the center toward the vertices of the bottom surface of the equilateral triangular pyramid. That is, the respective blades are provided at 120°. It is possible to form a cut in the lid 10a of the reagent bottle with the three blades. The number of blades may be four or more. Note that it is desirable from the point of force uniformization that seen from the distal end of the piercing portion 105b, the blades are provided at the vertex of the regular polygon. When the distal end of the piercing portion 105b is shaped in a square pyramid, the respective blades are formed from the center toward the vertices of the bottom surface of the square pyramid. That is, the respective blades are provided at 90°.

Figure 13:
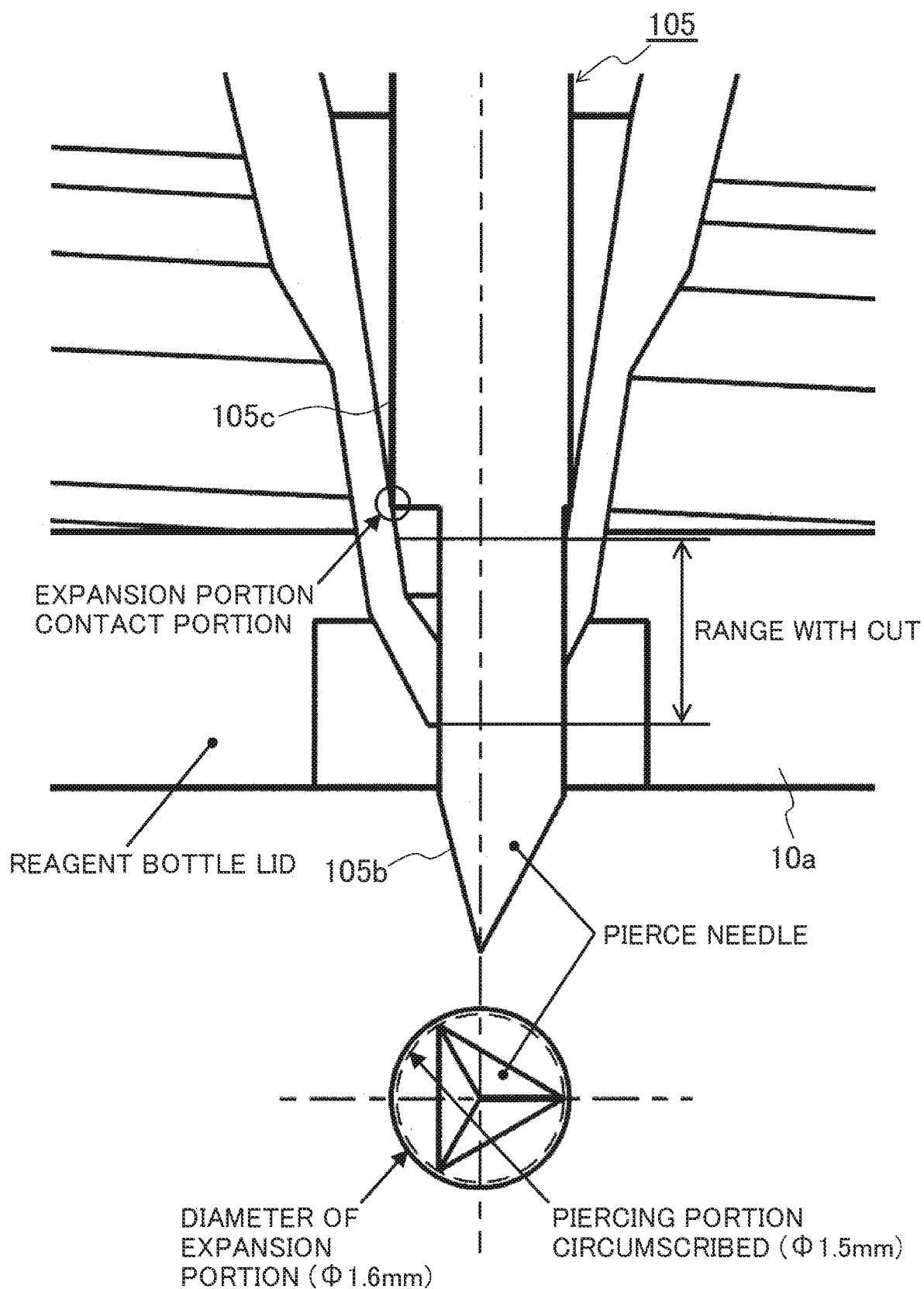
FIG. 13 illustrates a sectional view showing insertion when the diameter of an expansion portion is larger than that of a circumscribed circle of a piercing portion.

FIG. 13 illustrates a sectional view showing insertion of the pierce needle 105 into the lid 10a of the reagent bottle when the diameter of the expansion portion 105c is larger than the diameter of the circumscribed circle of the piercing portion 105b. In FIG. 13, the diameter of the circumscribed circle of the piercing portion 105b is φ1.5 mm, and the diameter of the expansion portion 105c is φ1.6 mm. As shown in FIG. 13, when the diameter of the expansion portion 105c is larger than the diameter of the circumscribed circle of the piercing portion 105b, the expansion portion comes into contact with the lid 10a of the reagent bottle in a position higher than a cut range with the pierce needle 105. Since no cut is made in this contact position, the load upon insertion is increased. In the contact position for the expansion portion 105c, a step portion is formed from the difference in cross-sectional shape between the piercing portion 105b and the expansion portion 105c. As the corners of the step portion are strongly rubbed against the edge of the cut and the inside of the lid 10a of the reagent bottle, there is a high possibility that a burr occurs. Even when the corners of the step portion are rounded or tapered, as it is expanded over the size of the cut made with the pierce needle 105, the insertion load on the piece needle 105 is greatly increased. To reduce the load on the reagent probe 7a upon insertion, the diameter of the expansion portion 105c may be increased. However, when the diameter is further larger than the cut made with the pierce needle 105, the area of the opening of the cut is also increased. This is against the purpose of preventing the deterioration of reagent by reduction of air inflow as the initial purpose of the reagent bottle 10. Accordingly, it is preferable that the diameter of the expansion portion 105c is smaller than the diameter of the circumscribed circle of the piercing portion 105b and equal to or larger than the diameter of the reagent probe 7a. It is possible to push and open the member of the lid 10a of the reagent bottle after the passage of the three blades with the thickness approximately the same as that of the reagent probe 7a. As the central axis of the piercing portion 105b and the central axis of the expansion portion 105c are aligned with each other, and by approximating the diameter of the expansion portion 105c to the diameter of the circumscribed circle of the piercing portion 105b, it is possible to uniformly open the endpoints of the cut in the three positions, and reduce the maximum insertion load on the reagent probe 7a upon initial insertion. Further, by uniformly and fully opening the cut having three sides, it is possible to reduce frictional resistance with respect to the reagent probe 7a, and suppression of the occurrence of burr due to sliding is expected.

Note that when the diameter of the expansion portion 105c is the same as the diameter of the circumscribed circle of the piercing portion 105b, the effect by the alignment between the central axes is obtained. Further, the slightly-connected portions are uniformly opened. However, in this case, as the outermost part of the cut formed with the piercing portion 105b and the expansion portion 105c are in the same position, the force acts in a direction to tear the ends of the cut. For example, the tearing force acts on the respective ends in the three points. The force is concentrated on the weakest point, there is a possibility that the one end is slightly torn. When such tear occurs, the uniformity of cut is broken, and there is a high possibility that a burr occurs due to sliding. Accordingly, it is desirable that the diameter of the expansion portion 105c is not equal to but smaller than the diameter of the circumscribed circle of the piercing portion 105b.

FIG. 14 shows an example of a flowchart of forming a cut in the lid 10a of the reagent bottle using the pierce needle 105 in FIG. 11. In the example of FIG. 14, one reagent bottle 10 is shown. The one reagent bottle contains two reagents, accordingly, the number of the lids 10a of the reagent bottle is two.

First, at Step 1, the reagent bottle 10 is installed in a predetermined position in the device. At Step 2, when the device recognizes that the reagent bottle 10 has been installed, the reagent bottle 10 is moved to a reagent bottle opening position (pierce needle insertion position) in the lid opening mechanism 40. At Step 3, downward movement of the reagent bottle lid opening mechanism 104 and the pierce needle 105 is started. At Step 4, the piercing portion 105*b* of the pierce needle 105 forms a cut in the lid 10*a* of the reagent bottle. The reagent bottle lid opening mechanism 104 does not stop but moves downward. At Step 5, the expansion portion 105*c* is inserted into the cut. The cut is pushed and opened with the expansion portion 105*c*. At Step 6, the reagent bottle lid opening mechanism 104 moves downward by a predetermined amount and stops. The amount of downward movement is previously stored as a parameter in the device. At Step 7, the reagent bottle lid opening mechanism 104 moves upward, to pull the pierce needle 105 from the lid, and stops in a predetermined position. There is a possibility that the distal end of the pierce needle 105 inserted in the lid 10*a* of the reagent bottle has been in contact with the reagent. Accordingly, at Step 8, cleaning with cleaning rinse water and drying are performed. The procedure for cleaning and drying will be omitted. Next, when cuts have been formed in the two lids 10*a* pf the reagent bottle, at Step 9, the reagent bottle 10 is carried with the reagent bottle transport mechanism 41 to the reagent disk 9 in the device, and is stored in the reagent disk 9. Otherwise, the process returns to Step 2 to form the cuts. The position of the reagent bottle 10 stored in the reagent disk 9 is stored with the controller 21. When an analysis order occurs, then at Step 10, the reagent disk 9 is rotated to move the reagent bottle 10 to a reagent suction position. At Step 11, the reagent probe 7*a* in the cylindrical shape is inserted from the cut in the lid 10*a* of the reagent bottle. The reagent is sucked into the reagent probe 7*a*, and is discharged into the reaction vessel 2. The operations of the device are controlled with the controller 21.

In this manner, as the reagent bottle lid opening mechanism 104 and the pierce needle 105 continuously move downward by the end of the downward movement, the expansion portion 105*c* is continuously inserted into the cut. The expansion portion 105*c* is copied from the reagent probe 7*a*. It pushes and opens the cut as in the case of insertion of the reagent probe 7*a*, and cut-opens the slightly-connected portion(s) as shown in FIG. 8. With this configuration, it is possible to realize a cut uniformly formed at the respective endpoints, and reduce the maximum insertion load on the reagent probe 7*a* upon initial insertion. Further, the operation to form a cut with the piercing portion 105*b* and push and open the cut with the expansion portion 105*c* is realized with one operation of downward movement of the pierce needle 105. Accordingly, addition of a mechanism is unnecessary. Further, when the length of the piercing portion 105*b* and the length of the expansion portion 105*c* are set to be equal to or longer than the length of insertion in the lid 10*a* of the reagent bottle by a predetermined amount of downward movement, the device operates with the same amount of downward movement as that in the conventional art. Accordingly, it is not necessary to extend the operation time. Further, it was experimentally confirmed that when the diameter of a dummy nozzle was smaller than the circumscribed circle of the pierce needle 105, there was no big difference in the area of the opening of the cut after 1000 times of insertion/removal of the reagent probe (reagent nozzle) 7*a*.

Figure 15:
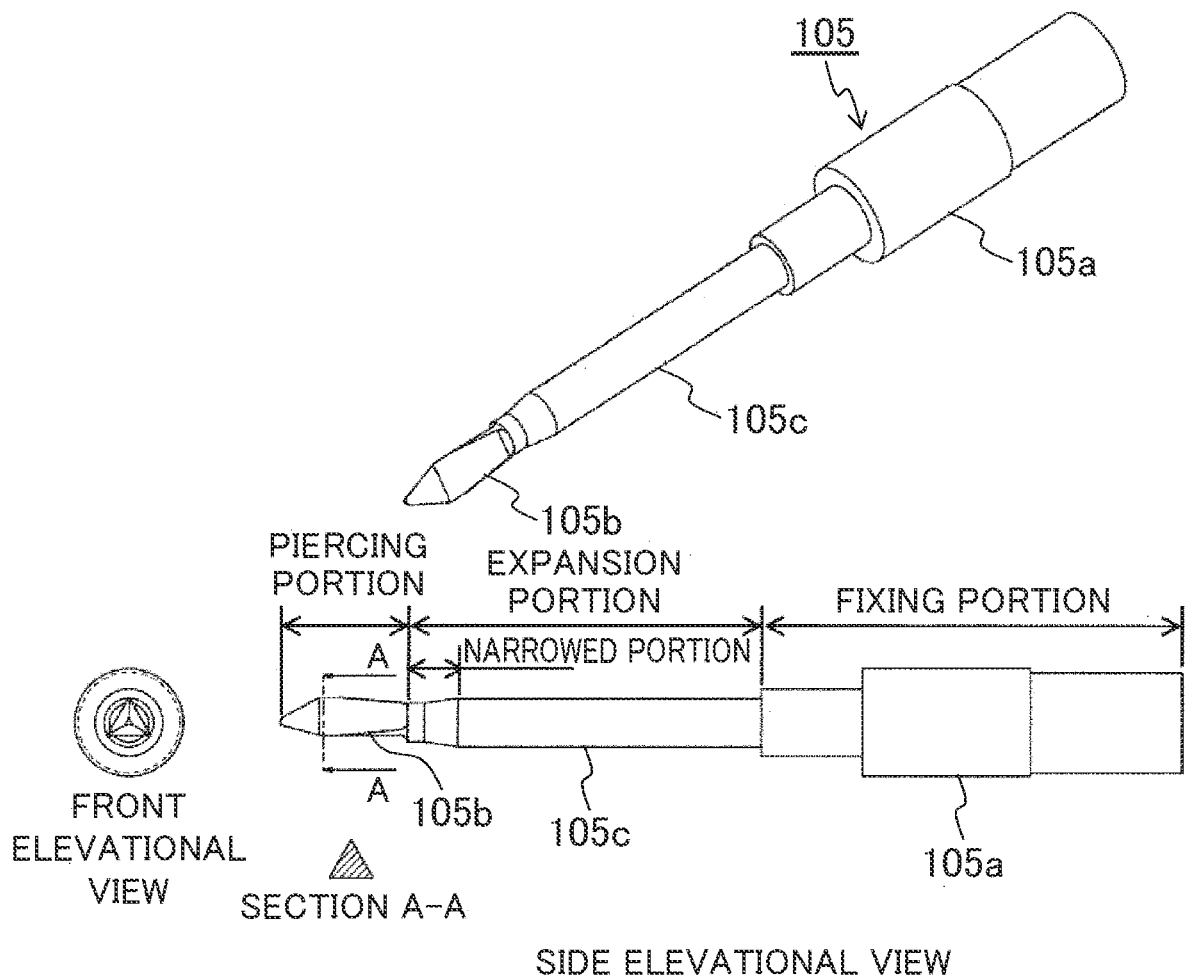
FIG. 15 illustrates a perspective view, a side elevational view and a front view of the pierce needle with a narrowed portion in the expansion portion.
Figure 16:
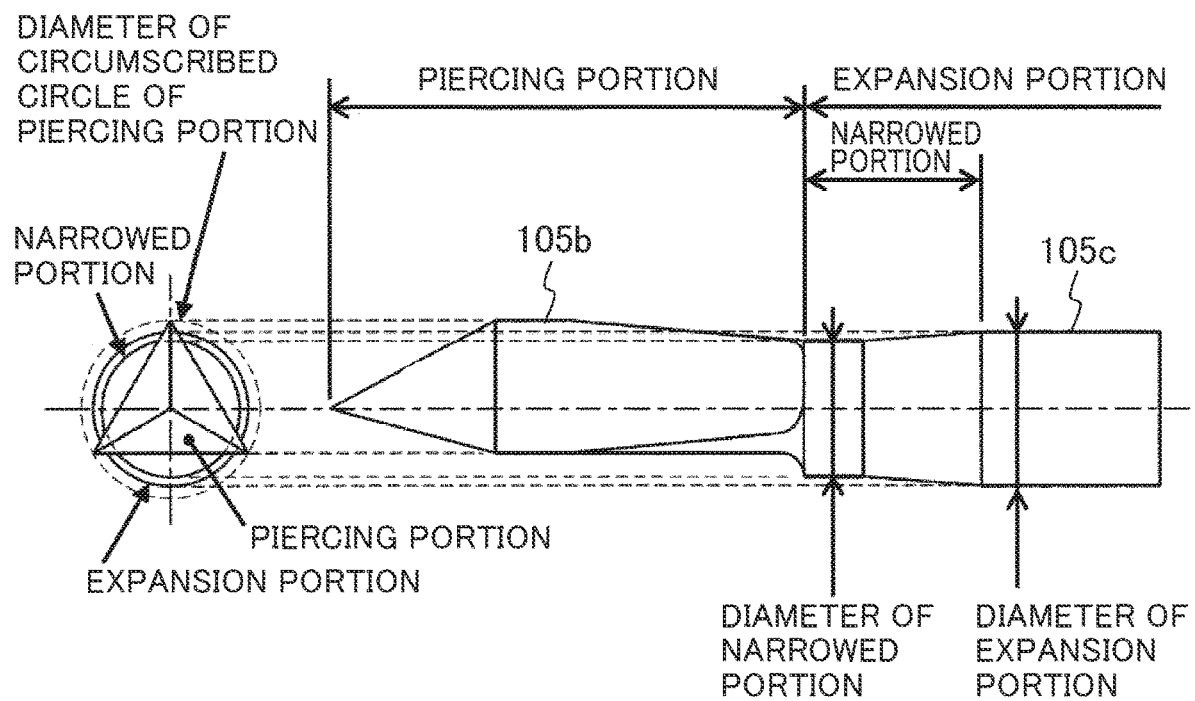
FIG. 16 illustrates a push and opened view of the distal end of the pierce needle shown in FIG. 15.
Figure 17:
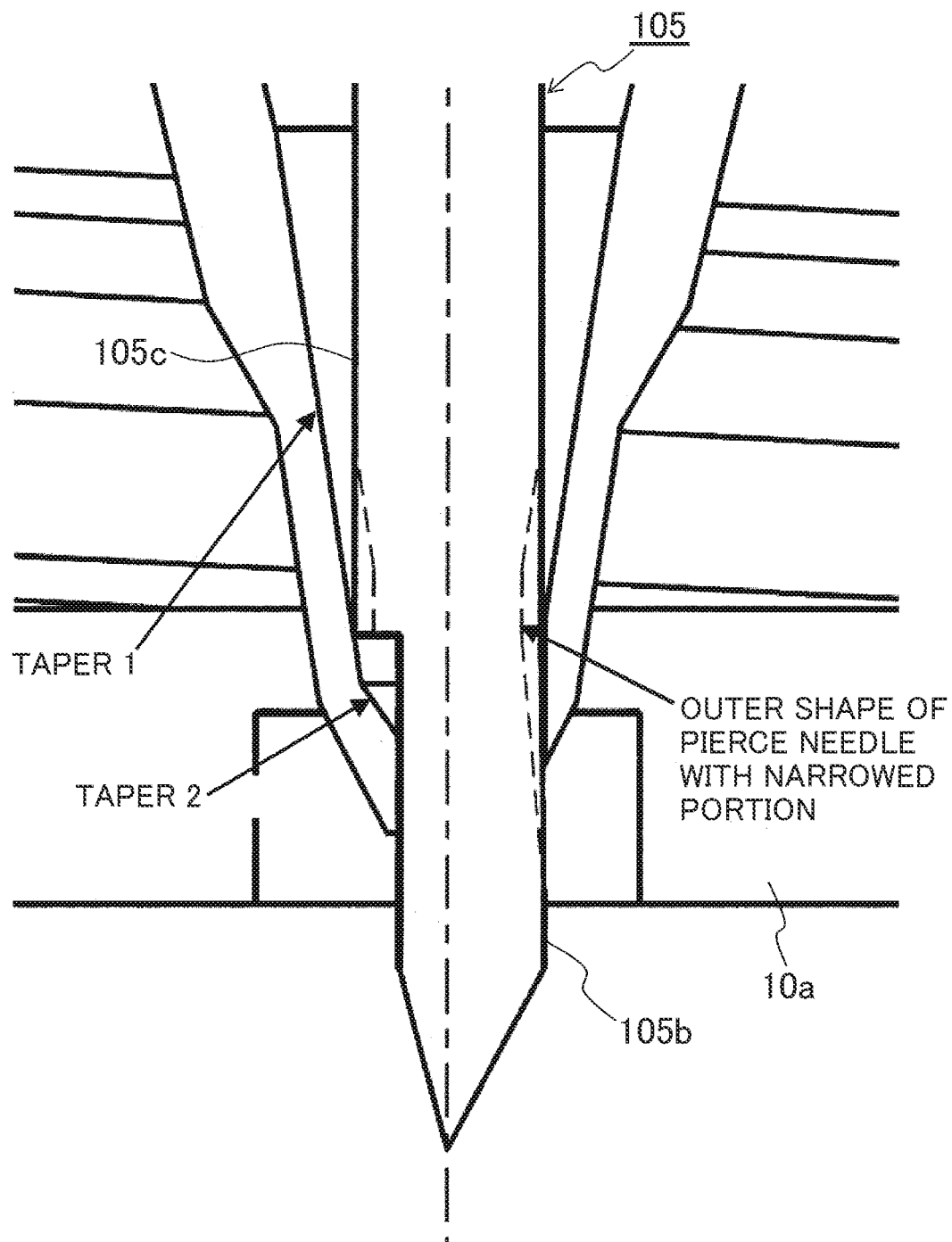
FIG. 17 is a sectional view when the pierce needle of FIG. 15 and the pierce needle of FIG. 12 are inserted through a reagent bottle lid.

In the example of FIG. 11, the diameter of the expansion portion 105*c* is in one stage (cylinder) and is connected to the piercing portion 105*b*. FIG. 15 shows an example where the diameter of the expansion portion 105*c* is in two stages and is provided with a narrowed portion. FIG. 16 shows an enlarged view of the distal end of the pierce needle 105. FIG. 17 is a longitudinal sectional view when the pierce needle 105 in FIG. 11 and the pierce needle 105 in FIG. 15 are inserted into the lids 10*a* of the reagent bottle. The position of the pierce needle 105 in FIG. 11 is the same as that in FIG. 15, and the shape of the piercing portion 105*b* is the same. In FIG. 17, the narrowed portion is indicated with a broken line.

As shown in FIG. 16, a cylinder having a diameter smaller than the diameter of the main body of the expansion portion 105*c* is provided on the piercing portion 105*b* side of the expansion portion 105*c*. These cylindrical shapes are connected in a shape where the diameter is gradually reduced toward the piercing portion 105*b*. That is, this connection portion is apart of the conical shape. The narrowed portion having a diameter smaller than the cylindrical expansion portion 105*c* is pushed inside the reagent bottle 10 with the controller 21 in accordance with insertion to the expansion portion 105*c*.

Figure 18:
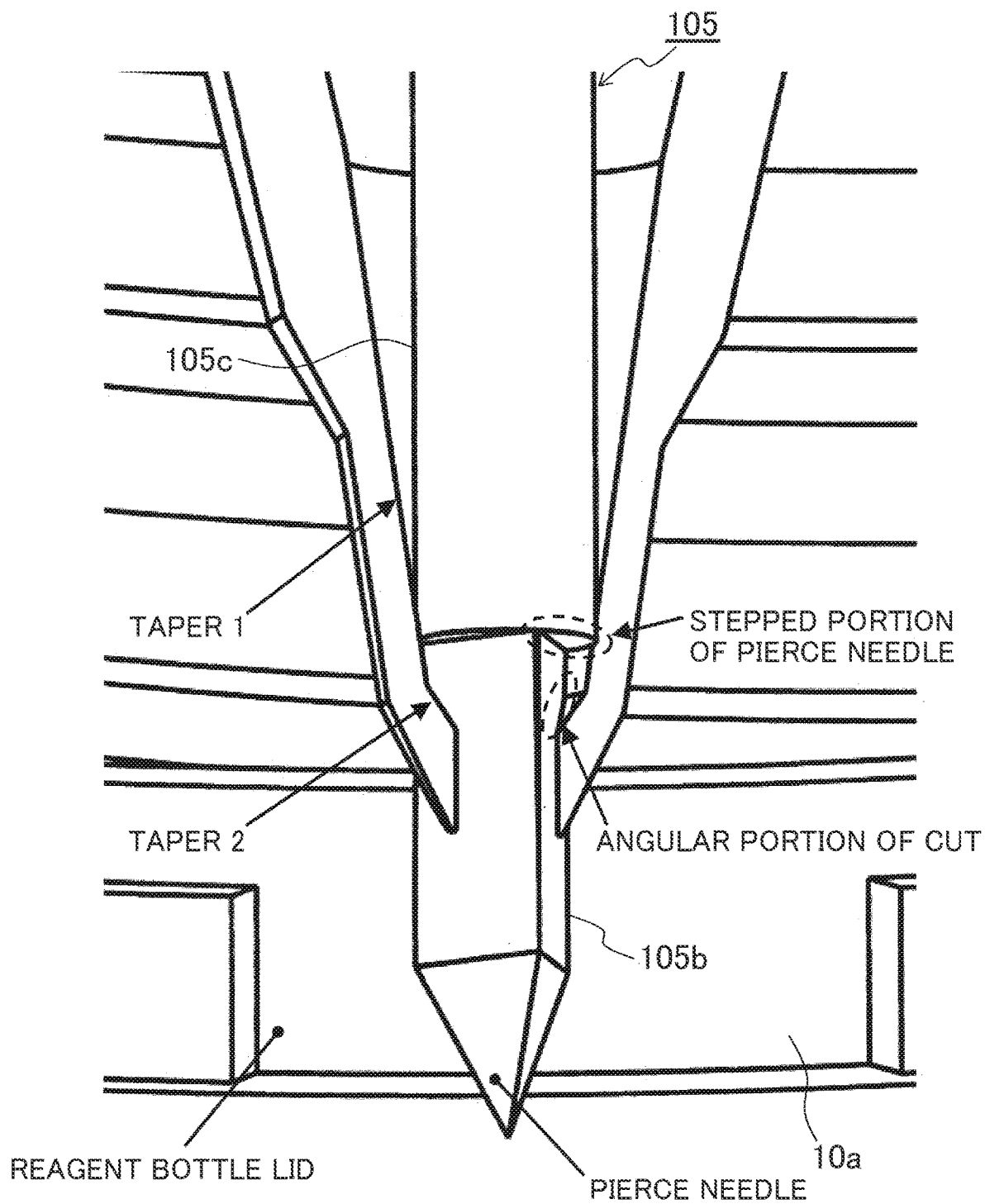
FIG. 18 is a view illustrating how a pierce needle having no narrowed portion is inserted.

Further, as shown in FIG. 17, the tapered portion inside the lid 10*a* of the reagent bottle has a two-stage form. That is, there are two types of taper angles. In the example of FIG. 11, the effects of the reduction of maximum insertion load and the reduction of burr are expected when the diameter of the expansion portion 105*c* is close to the diameter of the circumscribed circle of the piercing portion 105*b*. However, there is a possibility that the corners of the step portion between the piercing portion 105*b* and the expansion portion 105*c* in FIG. 11 is caught with the change portion between a taper 1 and a taper 2 in FIG. 17. FIG. 18 is a view illustrating insertion of the not-narrowed pierce needle 105 without narrowed portion. In FIG. 18, only the lid 10*a* of the reagent bottle is shown in a cross section but the pierce needle 105 is not shown in a cross section. The taper 2 has a cut formed with the piercing portion 105*b* on its inner side. There is a possibility that the pierce needle is moved downward, with the corner of the pierce needle 105 (step portion) caught with the change portion between the taper 1 and the taper 2. In this case, there is a possibility that the corner of the cut on the inner side of the taper 2 is shaved with the corner of the pierce needle 105 as a burr, and the burr is mixed in the reagent bottle 10. To prevent this inconvenience, the expansion portion 105*c* of the pierce needle 105 is provided with a narrowed portion. The diameter of the narrowed portion is smaller than the diameter of the change portion between the taper 1 and the taper 2, such that the pierce needle 105 is moved downward without being caught with the change portion between the tapers. Further, as the area of contact between the corner of the pierce needle 105 and the inside of the lid 10*a* of the reagent bottle is also reduced, the risk of occurrence of burr formed by shaving of the lid 10*a* of the reagent bottle with the corner of the pierce needle 105 is reduced.

From the above situation, the piercing portion 105*b* and the expansion portion 105*c* are integrated with each other, and the diameter of the expansion portion 105*c* is smaller than the diameter of the circumscribed circle of the cross-sectional shape (triangular shape) of the piercing portion 105*b* as the size of the cut, and is the same or larger than the diameter of the reagent probe 7*a*. To reduce the load on the reagent probe 7*a* upon initial insertion, the diameter of probe 7*a*, and the effect of this configuration is expected. Further, the expansion portion 105*c* is provided with a narrowed portion. As the diameter of the expansion portion 105*c* is smaller than the diameter of the taper change portion inside the lid 10*a* of the reagent bottle, it is possible to uniformly push and open the endpoints in the three positions of the cut formed with the piercing portion 105*b*. With this configuration, it is possible to reduce the maximum insertion load on the reagent probe 7a upon initial insertion. Further, the effect of reduction of the occurrence of burr due to repeated sliding of the reagent probe 7a is expected.

When the diameter of the expansion portion 105c is larger than the diameter of the circumscribed circle of the horizontal cross-sectional triangular shape of the piercing portion 105b, the cut formed with the piercing portion 105b is further expanded over the slightly-connected portion between the endpoints. Accordingly, a large force is required for insertion of the pierce needle 105. Further, when the opening with the cut is too large, there is a possibility that the air inflow is increased. Accordingly, it is desirable that the diameter of the expansion portion 105c is slightly smaller than the diameter of the circumscribed circle of the cross-sectional shape of the piercing portion 105b.

For example, assuming that the circumscribed circle of the triangle of the piercing portion 105b is $\phi 1.5$ mm and the diameter (outer diameter) of the reagent probe 7a is $\phi 1.15$ mm, the diameter of the expansion portion 105c is within the range $1.15 \leq$ the diameter of the expansion portion $105c < 1.5$, and the diameter of the expansion portion 105c is about $\phi 1.45$ mm. The open condition of the cut was experimentally compared using two types of diameter of the expansion portion 105c, $\phi 1.15$ mm (equivalent to that of the reagent probe 7a) and $\phi 1.45$ mm (slightly smaller than the circumscribed circle of the piercing portion 105b). As a result, it was found that when the diameter was $\phi 1.15$ mm, the open condition was non-uniform in the three sides, on the other hand, when the diameter was $\phi 1.45$ mm, the three sides were uniformly opened. Further, the area of the opening after 1000 times of insertion/removal of the reagent probe 7a through the cut in the lid 10a of the reagent bottle was experimentally compared using the expansion portion 105c having the diameter of $\phi 1.15$ mm, $\phi 1.45$ mm, and $\phi 1.60$ mm (slightly larger than the circumscribed circle of the piercing portion 105b). As a result, it was found that the area of the opening when the diameter was $\phi 1.15$ mm and the area of the opening when the diameter was $\phi 1.45$ mm are about the same, and that when the diameter was $\phi 1.60$ mm was slightly larger.

Note that in other words regarding the diameter size relation, it is desirable that the diameter of the cylindrical-shaped expansion portion 105c is smaller than the maximum diameter of the circumscribed circle of the plural blades of the piercing portion 105b, and equal to or larger than the maximum diameter of the reagent probe 7a within the range of insertion into the reagent bottle 10 to a position at which the reagent probe 7a sucks the reagent. Further, it is desirable that the diameter of the cylindrical expansion portion 105c is larger than the maximum diameter of the reagent probe 7a within the range of insertion into the reagent bottle 10 to a position at which the reagent probe 7a sucks the reagent.

In the above-described embodiment, the triangular-pyramid piercing portion 105b is integrated with the cylindrical dummy nozzle. The piercing portion 105b at the distal end may have other polygonal shape such as a quadrangular pyramid. That is, the piercing portion 105b has a polygonal pyramidal shape, and the sides of the polygonal pyramid correspond to the positions the blades are provided. Note that it is desirable from the viewpoint of force dispersion that the blades are provided in the sides of a regular polygonal pyramid. In the case of a polygonal shape, the relationship between the diameter of the circumscribed circle of the cross-sectional shape of the piercing portion 105b and the diameter of the expansion portion 105c is the same.

Figure 19:
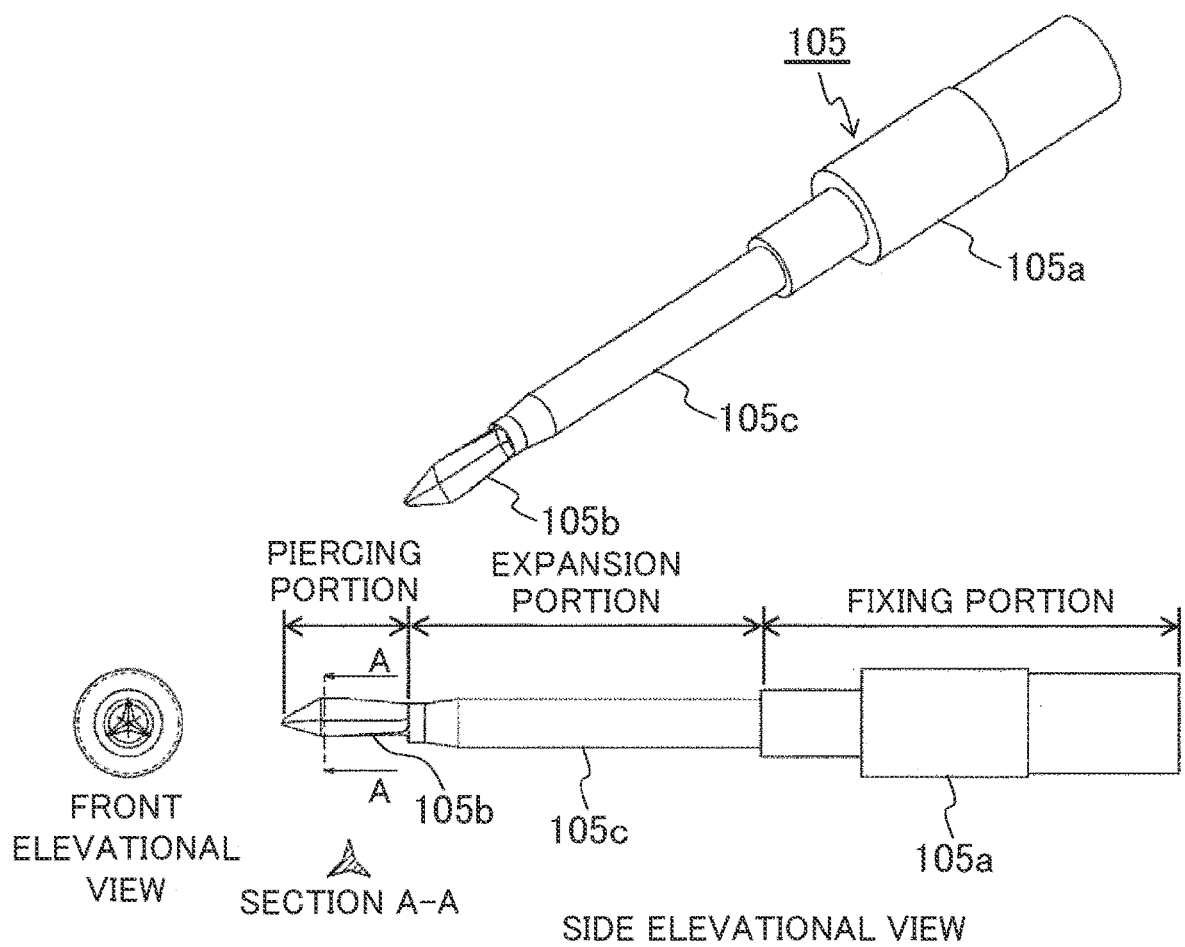
FIG. 19 illustrates a pierce needle according to another embodiment of the present invention.
Figure 20:
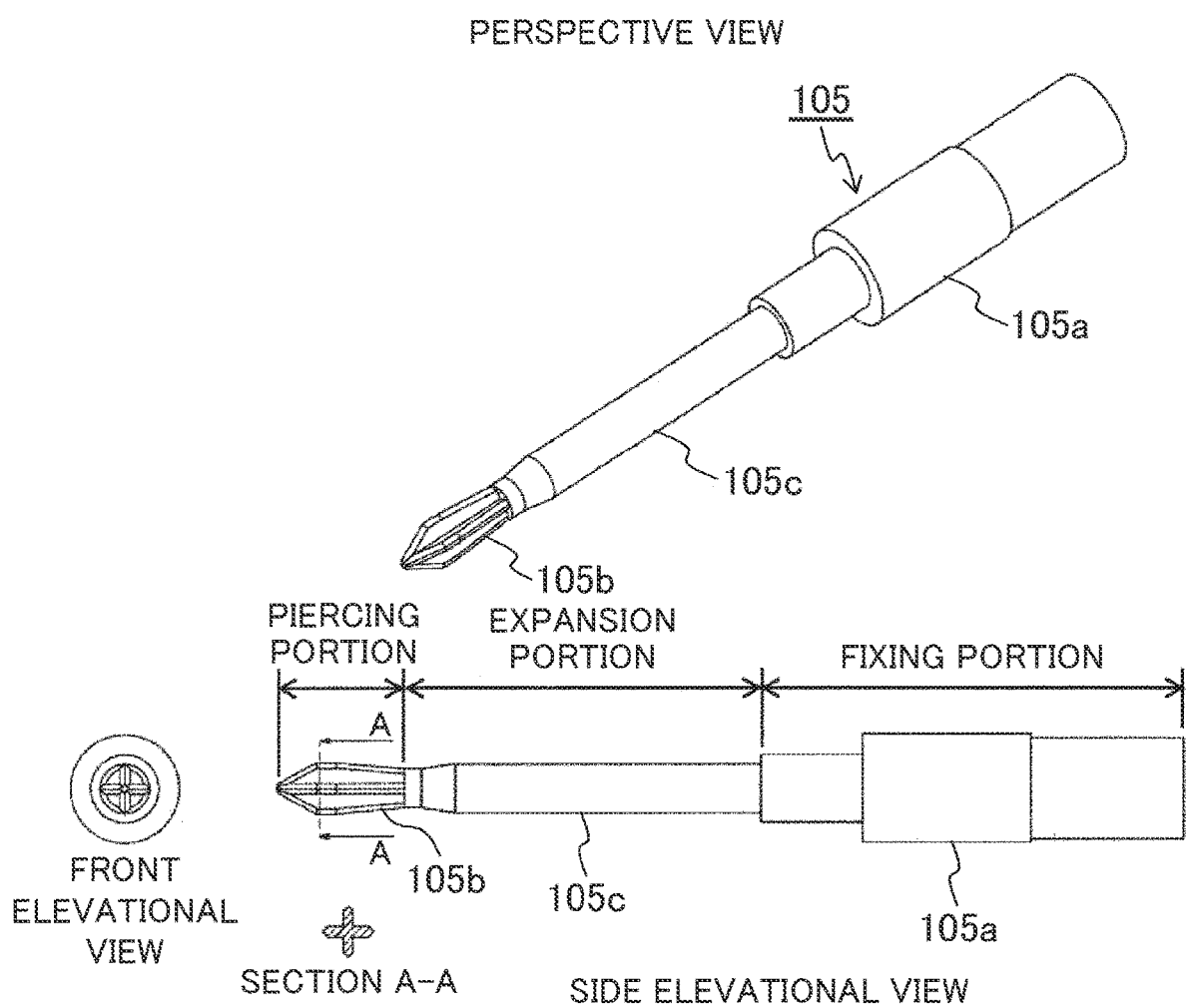
FIG. 20 illustrates a pierce needle according to still another embodiment of the present invention.

Further, it is conceivable that the piercing portion 105b has a star polygonal pyramid cross-sectional shape as shown in FIG. 19, and has a shape as a combination of plate-shaped blades as shown in FIG. 20. In the example of FIG. 19, the cross section is a star shape with the blades. The number of the blades may be four or more. In the example of FIG. 20, the number of blades is four, however, the number of blades may be three, or five or more. These piercing portions 105b rather have blades extending outward from the center, seen from the distal end side of the piercing portion 105b, than have a polygonal pyramidal shape. Note that the polygonal pyramid is one of examples where the blades extend outward from the center seen from the distal end side of the piercing portion 105b.

In the example of FIG. 19, the cross-sectional shape of the piercing portion 105b is star shape, and the blades to form a three-sided cut in the lid 10a of the reagent bottle are provided at a sharper angle. With the sharper angled blades, the effect of formation of a clean cut plane in the cut can be expected. When the cut plane is coarse to cause a burr, and the foreign material falls in the reagent bottle 10, there is a possibility that upon dispensing with the reagent probe 7a, it is sucked in the reagent probe 7a and causes clogging in the reagent probe 7a. Further, there is a possibility that the foreign material is discharged in the reaction vessel 2 to disturb measurement.

In the example of FIG. 20, the blades are plate shaped blades. As the distal end is thicker than that of the blades in FIG. 15 and FIG. 19, the strength of the end of the blades is improved in comparison with the examples in FIG. 15 and FIG. 19.

Figure 21:
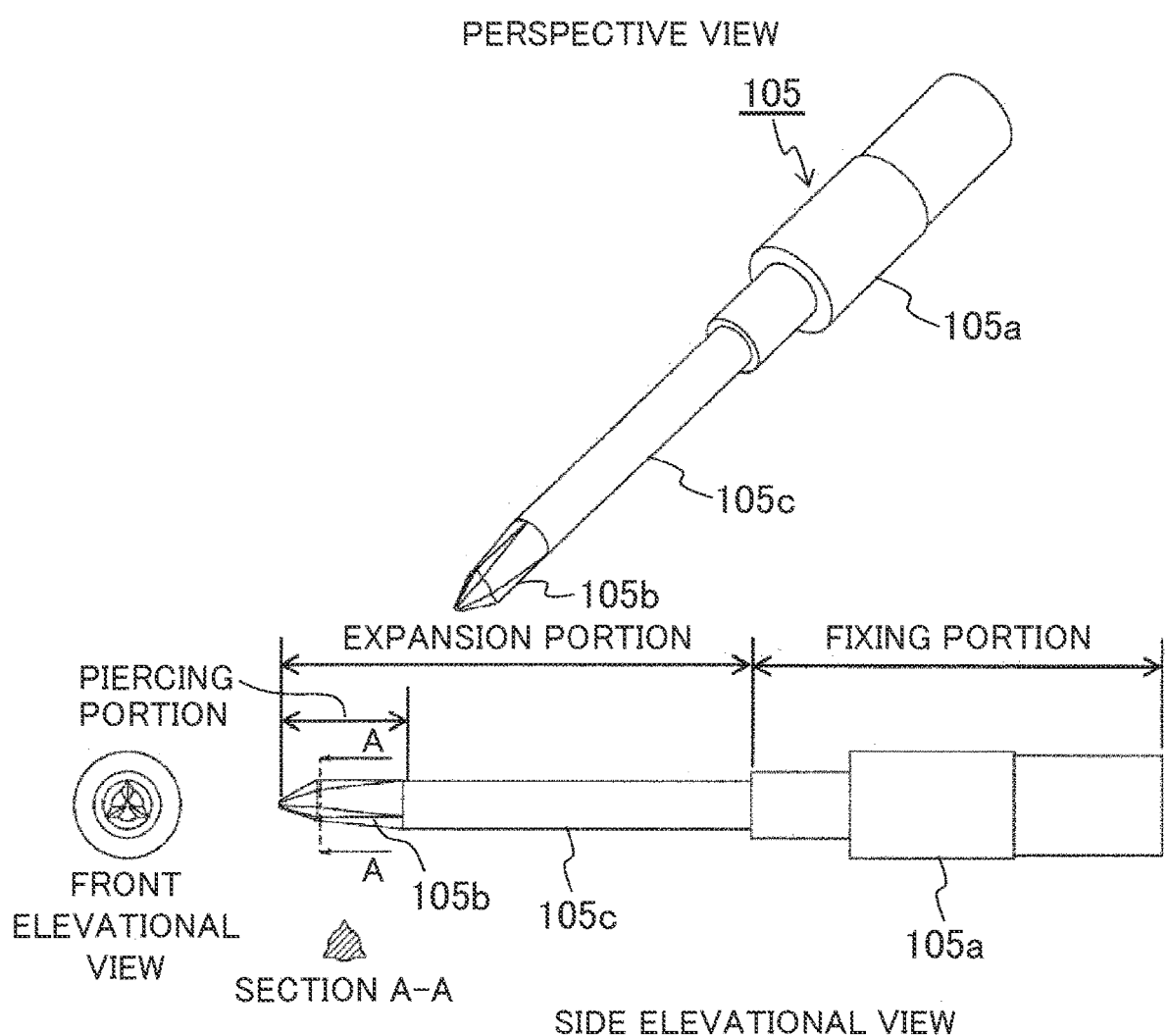
FIG. 21 illustrates a pierce needle according to still yet another embodiment of the present invention.

In the examples in FIGS. 15, 19 and 20, the piercing portion 105b exists with respect to the traveling direction of the pierce needle 105, and the expansion portion 105c exists behind the piercing portion. The piercing portion 105b and the expansion portion 105c are continuously inserted. FIG. 21 shows a structure as a combination of plural blades and a cone. The piercing portion 105b has a structure where the plural blades extending outward from the center seen from the distal end side are provided on a side surface of the cone. In the example of FIG. 21, the blades of the piercing portion 105b and the expansion portion 105c exist in one cross section. The piercing portion 105b and the expansion portion 105c are inserted, not continuously, but simultaneously. Accordingly, a cut is formed with the piercing portion 105b while the cut is pushed and opened with the expansion portion 105c. It is possible to reduce the load on the blades of the piercing portion 105b, and it is expected that the sharpness of the blades of the piercing portion 105b is maintained longer in comparison with FIGS. 15, 19 and 21. Further, the distal end of the expansion portion 105c is converged in the same position of the distal end of the piercing portion 105b. The position of convergence may be ahead or behind from the position of convergence of the distal end of the piercing portion 105b. In this example, the terminal end of the piercing portion 105b substantially functions as the expansion portion 105c. Accordingly, the shape of the expansion portion 105c from the piercing portion 105b has comparatively high freedom. As the diameter of the expansion portion 105c within this range, a diameter smaller than the diameter of the reagent probe 7a may be allowed. However, to realize infallible pushing and opening of a cut, it is desirable that the diameter is larger than the diameter of the reagent probe 7a within this range.

Further, the above-described expansion portion 105c is copied from the shape of the reagent probe 7a and has a cylindrical shape. However, the shape of the expansion portion 105c may be a polygonal prism shape having a triangular or square cross section. When the expansion portion 105c has a polygonal prism shape, the diameter of the above-described cylinder may be replaced with the diameter of the circumscribed circle of the polygon. More particularly, it is desirable that the diameter of the circumscribed circle of the polygonal prism is smaller than the maximum diameter of the circumscribed circle of the above-described plural blades of the piercing portion 105b, and is equal to or larger than the maximum diameter within a range of insertion into the reagent bottle 10 to a position at which the reagent probe 7a sucks the reagent. Note that it goes without saying that the circumscribed circle means a circumscribed circle in the horizontal cross section of the piercing portion 105b.

Further, in the examples of FIGS. 19 to 21, to maintain the sharpness, the needle distal end is rounded at a very small angle.

DESCRIPTION OF REFERENCE CHARACTERS

1: Reaction disk
2: Reaction vessel
3: Cleaning mechanism
4: Spectrophotometer
5: Agitation mechanism
6: Agitation mechanism
7: Reagent dispensing mechanism
7a: Reagent probe
8: Reagent dispensing mechanism
9: Reagent disk
10: Reagent bottle
11: Sample dispensing mechanism
11a: Sample probe
13: Cleaning tank
15: Specimen vessel
16: Rack
17: Specimen transport mechanism
18: Reagent syringe
19: Specimen syringe
20: Cleaning pump
21: Controller
30: Cleaning tank (for agitation mechanism)
31: Cleaning tank (for agitation mechanism)
32: Cleaning tank (for reagent dispensing mechanism)
33: Cleaning tank (for reagent dispensing mechanism)
40: Lid opening mechanism
41: Reagent bottle transport mechanism
104: Reagent bottle lid opening mechanism
105: Needle
130: Vertically driving motor
141: Belt
145: Pulley
146: Slider

The invention claimed is:

1. An automatic analyzer, comprising:
a sample probe configured to suck a specimen and discharge the specimen into a reaction vessel;
a reagent probe configured to suck a reagent and discharge the reagent into the reaction vessel;
a photometer configured to analyze a mixture of the specimen and the reagent in the reaction vessel;
a reagent disk configured to hold a reagent bottle storing the reagent;
a needle configured to form a cut in a lid of the reagent bottle;
a lid opening mechanism configured to drive the needle; and
a controller configured to control the lid opening mechanism,
wherein the needle comprises: a piercing portion including a plurality of blades for forming the cut in the lid of the reagent bottle and a cylindrical expansion portion configured to push into and open the cut,
wherein the plurality of blades are disposed at vertices of a regular polygon as viewed from a distal end of the piercing portion,
wherein the cylindrical expansion portion has a diameter smaller than a maximum diameter of a circumscribed circle passing through all vertices of the regular polygon of the plurality of blades of the piercing portion and has the diameter that is equal to or larger than a maximum diameter of the reagent probe within a range within which the reagent probe is inserted into the reagent bottle before the reagent probe sucks the reagent,
wherein the cylindrical expansion portion includes a stepped portion,
wherein the piercing portion includes a tapered portion extending from a vertex of the regular polygon of a blade of the plurality of blades toward the stepped portion of the cylindrical expansion portion,
wherein an axial length of the cylindrical expansion portion is greater than an axial length of the piercing portion, and
wherein the controller is programmed to control the lid opening mechanism so that the needle is inserted to the expansion portion after the cut is formed in the lid of the reagent bottle by the piercing portion.

2. The automatic analyzer according to claim 1, wherein the controller is further programmed to control the lid opening mechanism to insert the expansion portion of the needle to a location of the lid in which the cut is formed by a single downwardly, moving operation thereby to push and open the lid member between locations through which the plurality of blades pass.

3. The automatic analyzer according to claim 1, wherein the diameter of the cylindrical expansion portion is greater than the maximum diameter of the reagent probe within the range within which the reagent probe is inserted into the reagent bottle before the reagent probe sucks the reagent.

4. The automatic analyzer according to claim 1, wherein the piercing portion has a polygonal pyramid shape and the sides of the polygonal pyramids correspond to the plurality of blades.

5. The automatic analyzer according to claim 1, wherein the plurality of blades are blades extending from the center to the outer side as viewed from the distal end of the piercing portion.

6. The automatic analyzer according to claim 1, wherein the reagent probe sucks the reagent stored in the reagent bottle through the cut opened by pushing of the expansion portion.

7. The automatic analyzer according to claim 1, further comprising
a reagent bottle transport mechanism configured to transport the reagent bottle in which the cut has been formed by the needle to the reagent disk.

8. An automatic analyzer, comprising:
a sample probe configured to suck a specimen and discharge the specimen into a reaction vessel;

a reagent probe configured to suck a reagent and discharge the reagent into the reaction vessel;

a photometer configured to analyze a mixture of the specimen and the reagent in the reaction vessel;

a reagent disk configured to hold a reagent bottle storing the reagent;

a needle configured to form a cut in a lid of the reagent bottle;

a lid opening mechanism configured to drive the needle; and a controller configured to control the lid opening mechanism, wherein the needle comprises:

a piercing portion including a plurality of blades for forming the cut in the lid of the reagent bottle, and a cylindrical expansion portion configured to push into and open the cut, wherein the cylindrical expansion portion has a diameter which is smaller than a maximum diameter of a circumscribed circle of the plurality of blades of the piercing portion and is equal to or greater than a maximum diameter within a range within which the reagent probe is inserted into the reagent bottle to a position at which the reagent probe sucks the reagent, wherein the cylindrical expansion portion includes a stepped portion, wherein the piercing portion includes a tapered portion extending from a vertex of a blade of the plurality of blades toward the stepped portion of the cylindrical expansion portion, wherein an axial length of the cylindrical expansion portion is greater than an axial length of the piercing portion, and wherein the controller controls the lid opening mechanism so that the needle inserted to the expansion portion after the cut is formed in the lid of the reagent bottle by the piercing portion.

9. The automatic analyzer according to claim 1, wherein the stepped portion of the cylindrical expansion portion includes a flat surface facing downward toward the plurality of blades and perpendicular to an axial dimension of the needle.

* * * * *